US009662674B2

(12) United States Patent
Ayer et al.

(10) Patent No.: US 9,662,674 B2
(45) Date of Patent: May 30, 2017

(54) SYSTEMS AND METHODS FOR UNDERWATER WIRELESS RADIO-FREQUENCY COMMUNICATIONS

(71) Applicants: George Ayer, Concord (CA); Kifah Al-Ansari, Toronto (CA); David Barratt, Concord (CA)

(72) Inventors: George Ayer, Concord (CA); Kifah Al-Ansari, Toronto (CA); David Barratt, Concord (CA)

(73) Assignee: CRYSTAL FOUNTAINS HOLDINGS INC., Concord, Ontario (CA)

( * ) Notice: Subject to any disclaimer, the term of this patent is extended or adjusted under 35 U.S.C. 154(b) by 0 days.

(21) Appl. No.: 14/813,847

(22) Filed: Jul. 30, 2015

(65) Prior Publication Data

US 2016/0030967 A1 Feb. 4, 2016

Related U.S. Application Data

(60) Provisional application No. 62/031,984, filed on Aug. 1, 2014.

(51) Int. Cl.
*B05B 17/08* (2006.01)
*H04B 13/02* (2006.01)

(52) U.S. Cl.
CPC ............ *B05B 17/08* (2013.01); *H04B 13/02* (2013.01)

(58) Field of Classification Search
CPC ................................. B05B 17/08; H04B 13/02
USPC ....... 239/12, 16–18, 20–23, 67–70; 367/133, 367/134; 455/40
See application file for complete search history.

(56) References Cited

U.S. PATENT DOCUMENTS 3,165,966 A 1/1965 Pribyl
5,069,387 A 12/1991 Alba
(Continued)

OTHER PUBLICATIONS

Extended European Search Report from corresponding EP Application No. 15179341 dated Jan. 1, 2016.
(Continued)

*Primary Examiner* — Darren W Gorman
(74) *Attorney, Agent, or Firm* — Bereskin & Parr LLP/S.E.N.C.R.L., s.r.l.; Ian C. McMillan

(57) ABSTRACT

A fountain system and method of providing same is provided. This involves a plurality of communication nodes, each communication node being configured to operate when submerged in a liquid; and a plurality of fountain components for providing a plurality of fountain jets of liquid, each fountain component being linked to a communication node in the plurality of communication nodes and being operable to provide a fountain jet of liquid in the plurality of fountain jets of liquid. The plurality of communication nodes are operable to receive a plurality of fountain control signals transmitted through the liquid. The plurality of communication nodes are operable to control the plurality of fountain jets by communicating to each communication node in the plurality of communication nodes an associated fountain control signal for controlling the fountain component linked to that communication node. The plurality of fountain control signals are transmitted at a frequency in the range of 100 MHz to 1.2 GH.

18 Claims, 49 Drawing Sheets

System comprising two nodes in water-water communication

(56) References Cited

U.S. PATENT DOCUMENTS

| | | | |
|---|---|---|---|
| 6,375,090 B1* | 4/2002 | Beidokhti | B05B 17/08 239/16 |
| 8,495,965 B1* | 7/2013 | Hadida | F42B 8/00 114/331 |
| 2006/0194537 A1 | 8/2006 | McCoy | |
| 2007/0008713 A1* | 1/2007 | Doyle | B05B 15/00 362/101 |
| 2011/0073670 A1 | 3/2011 | Johnson | |
| 2011/0132994 A1* | 6/2011 | Wiseman | B05B 15/00 239/17 |
| 2013/0119149 A1* | 5/2013 | Brown | E03B 9/20 239/16 |
| 2014/0312137 A1* | 10/2014 | Fuller | B05B 13/04 239/17 |

OTHER PUBLICATIONS

Electromagnetic (EM) wave propagation for the development of an Underwater Wireless Sensor Network (WSN), 2011 IEEE Sensors Proceedings: Limerick, Ireland, pp. 1571-1574, XP032093512, Oct. 28, 2011.

* cited by examiner

| Frequency (MHz) | Wavelength in free space (m) | Wavelength in water (m) |
|---|---|---|
| 868 | 0.345 | 0.0383 |
| 434 | 0.69 | 0.077 |
| 169 | 1.775 | 0.1972 |

FIG. 1: Calculations of signal wavelength in free space and in water.

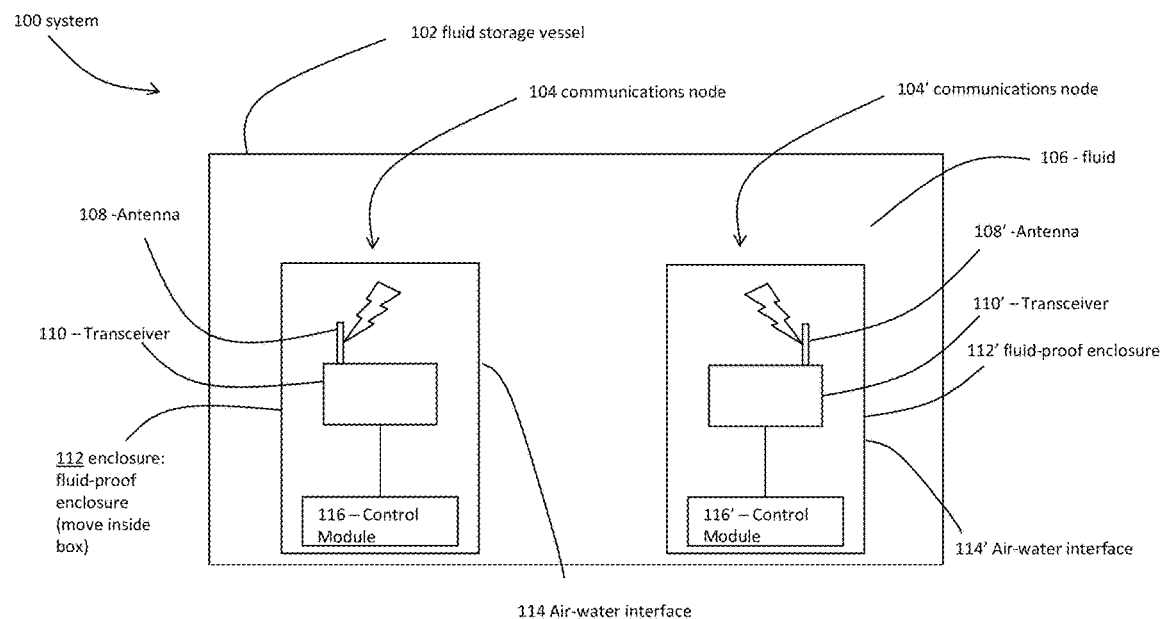
FIG. 2: System comprising two nodes in water-water communication

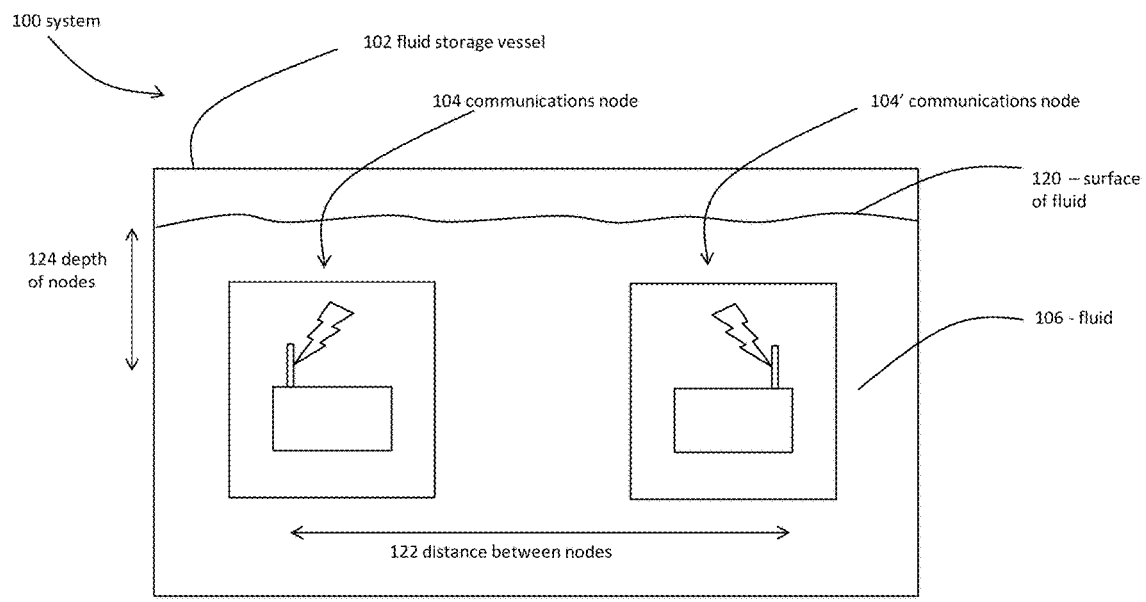
FIG. 3: System comprising two nodes in water-water communication, illustrating distance between nodes and depth of nodes

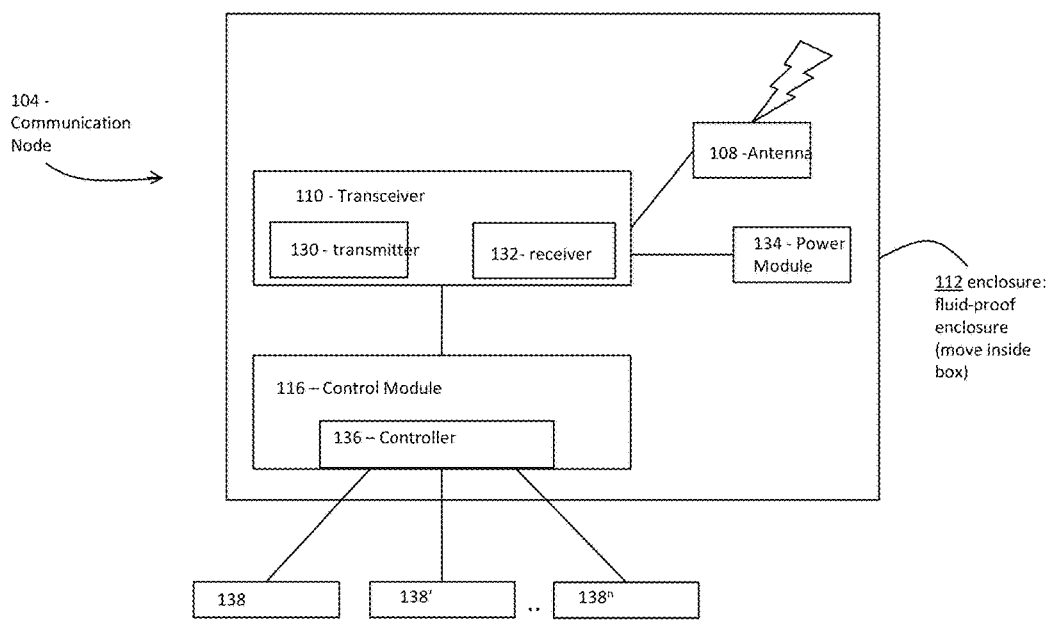
FIG. 4: Diagram of communication node

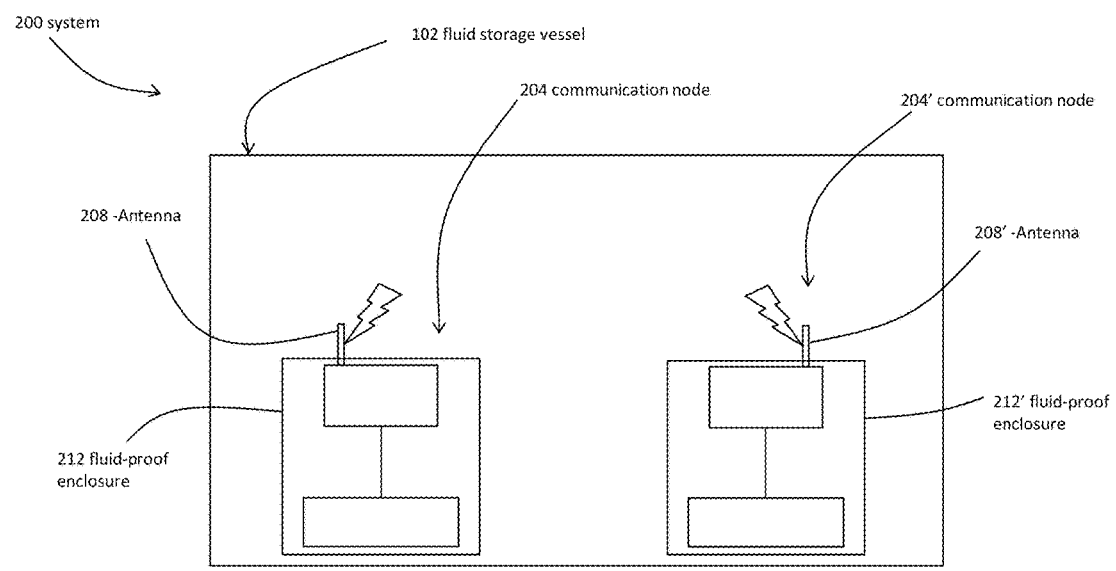
FIG. 5: System comprising two nodes in water-water communication wherein antennas protrude outwardly from fluid-tight enclosures

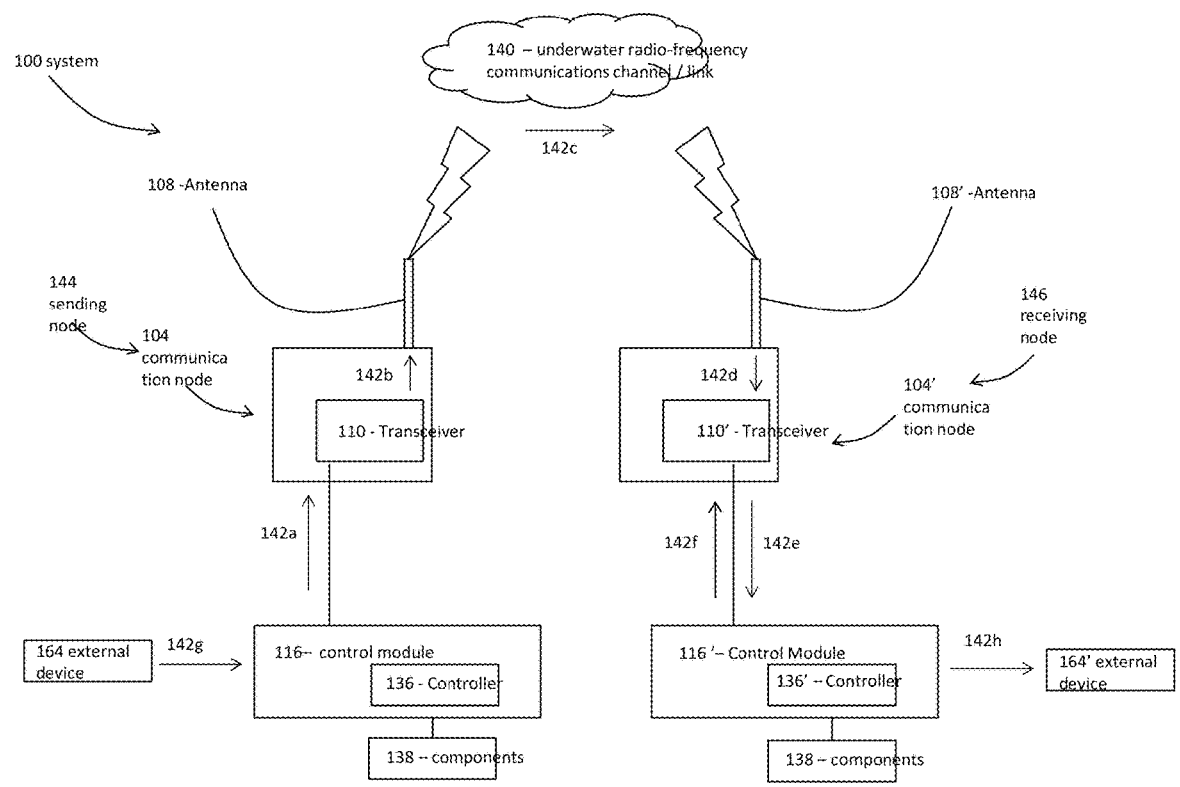
FIG. 6: System comprising two nodes in water-water communication and steps illustrating the communications channel

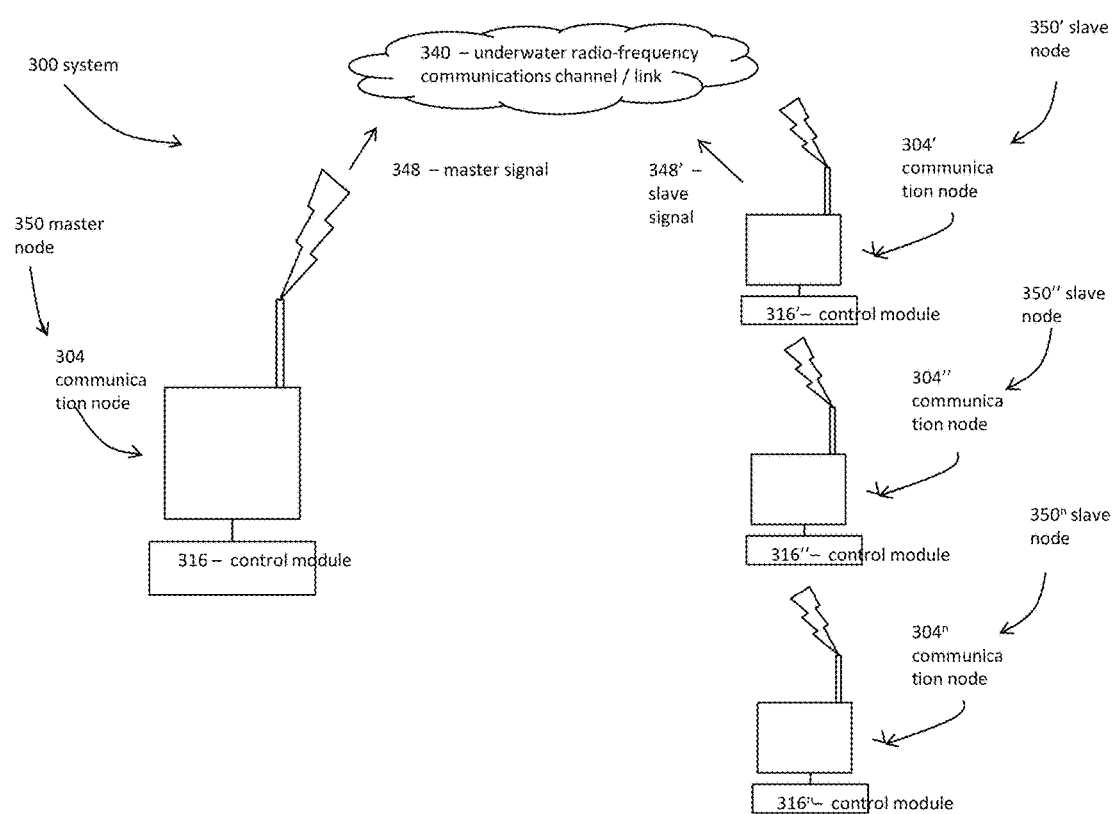
FIG. 7: System for underwater wireless communication (99b) having a master-slave signal flow configuration

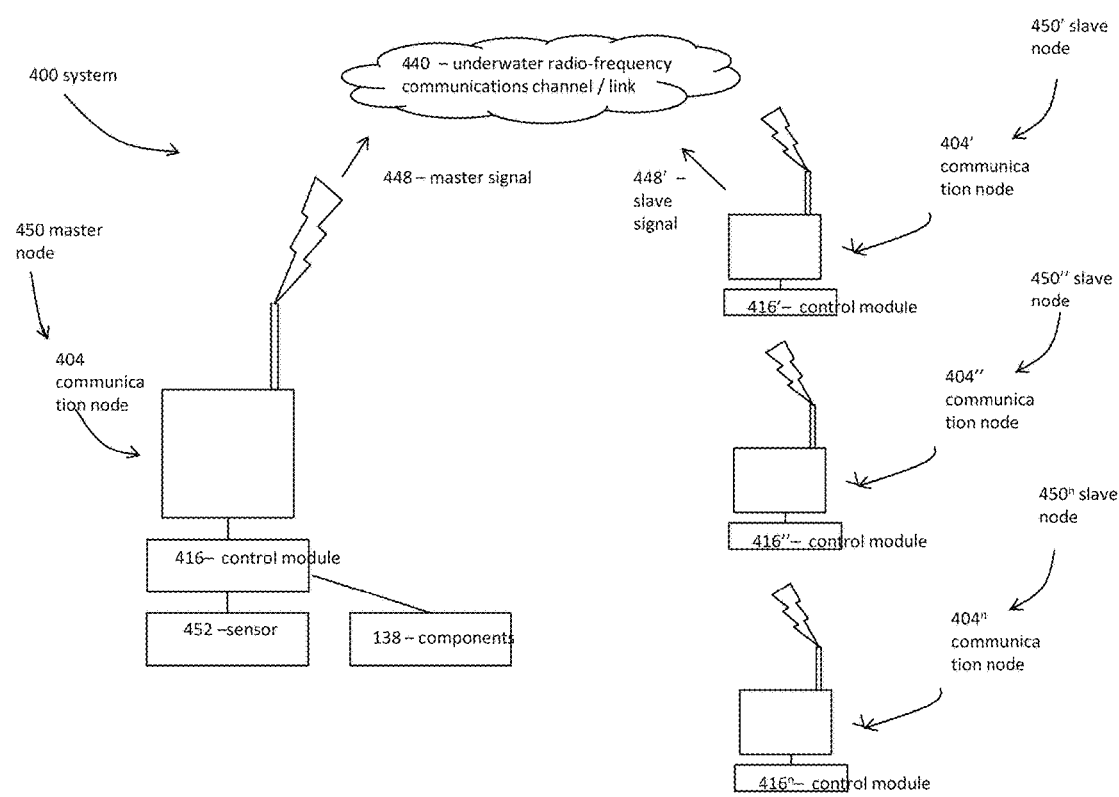
FIG. 8: System for underwater wireless communication (99b) having a master-slave configuration and a distributed control configuration

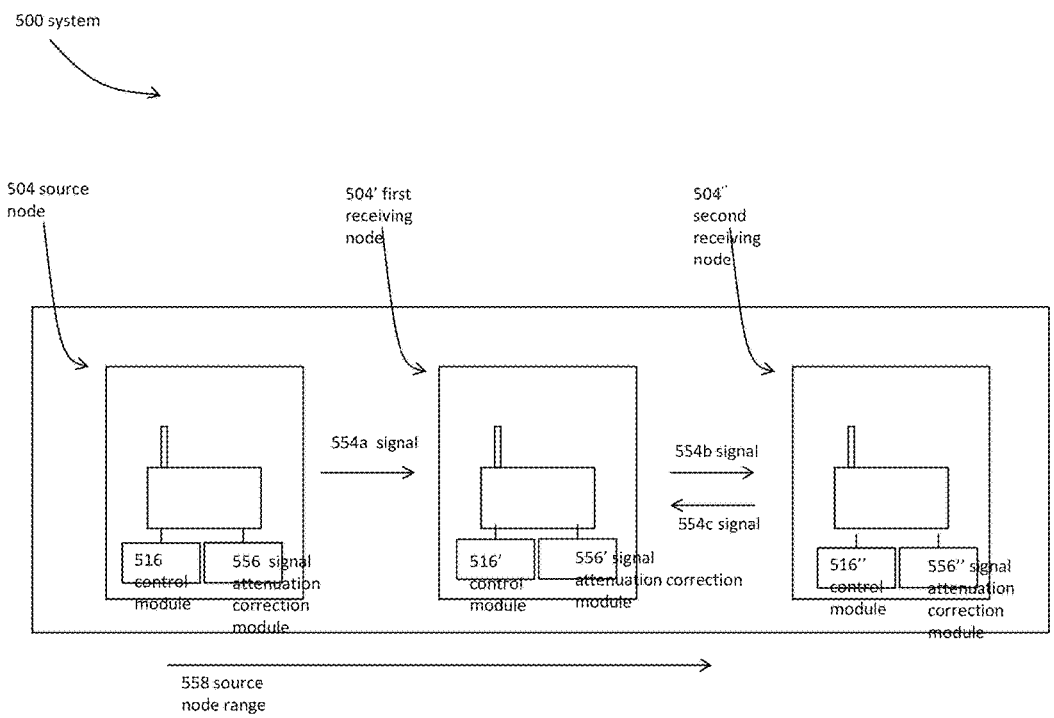
FIG. 9: System for underwater wireless communication (99d) wherein a signal may be relayed between nodes

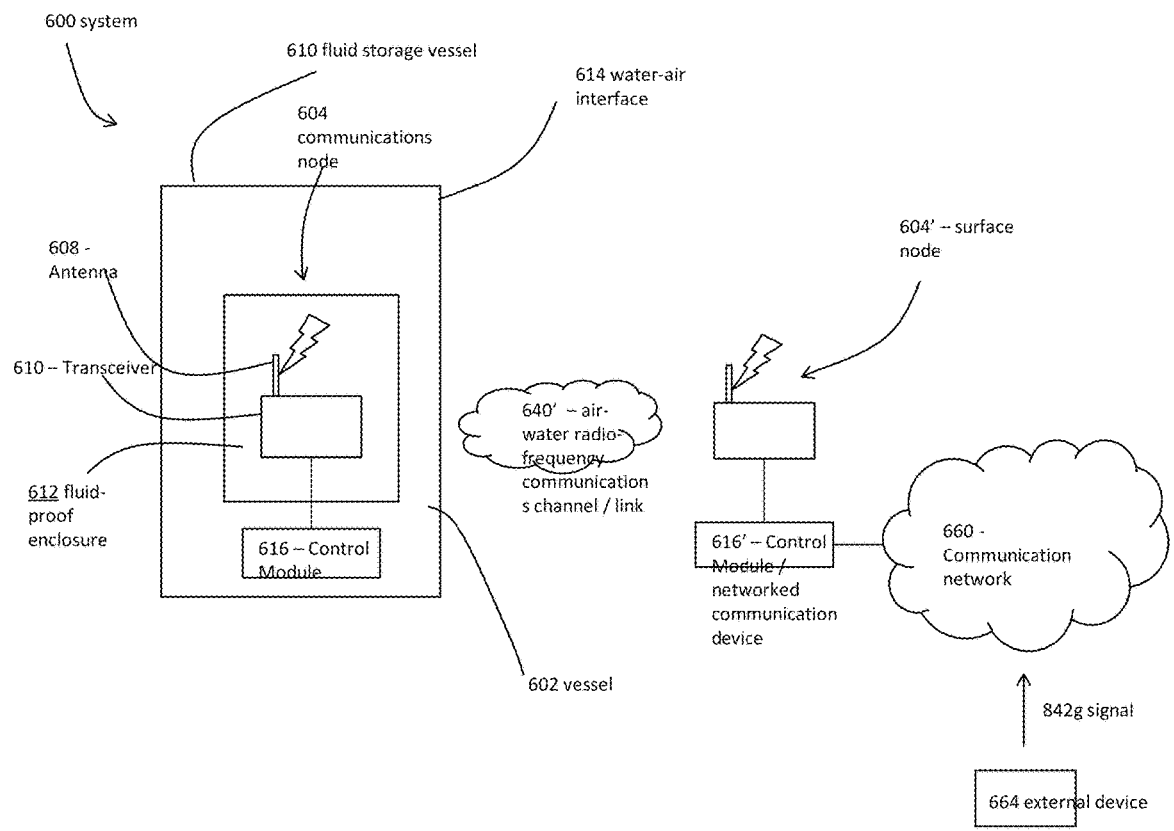
FIG. 10: System comprising a water-air communications system

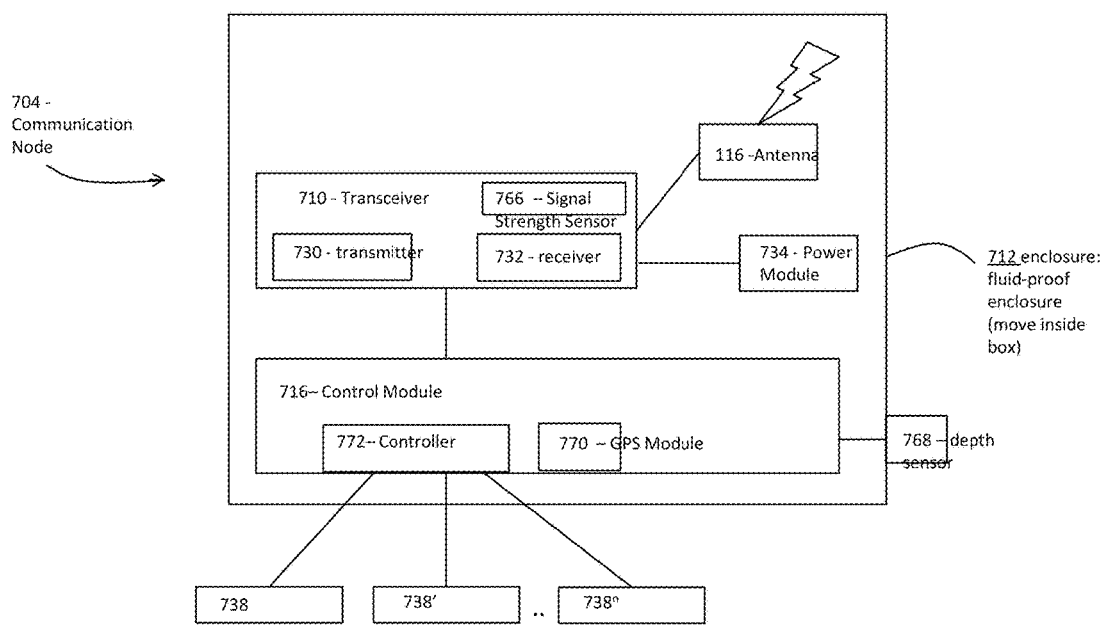
FIG. 11: Diagram of embodiment of communication node

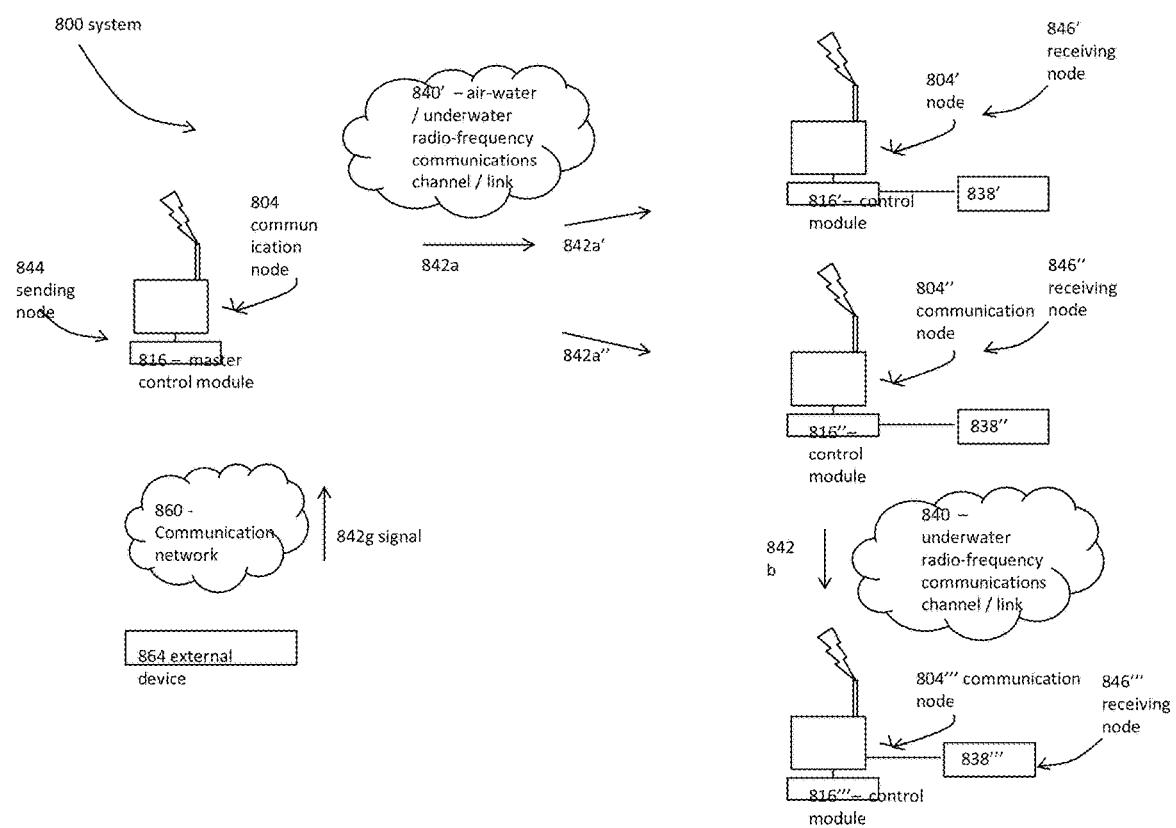
FIG. 12: System for underwater wireless communication

FIG. 14: Top-view of the pool shows two interfaces between the transceivers

FIG 15: Perspective view of experimental setup

FIG. 16: Experimetnal Setup

FIG. 17: Plan view of nodes in experimental setup

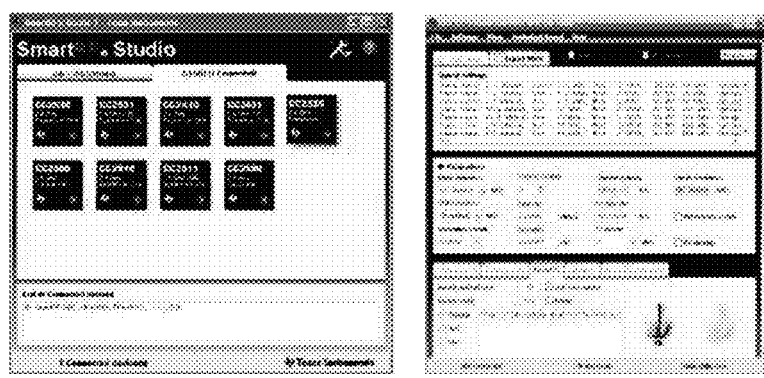
FIG. 19: Smart RF Studio

| Distance (feet) | RSSI (dBm) at depth 2 inches | RSSI (dBm) at depth 4 inches | RSSI (dBm) at depth 6 inches | RSSI (dBm) at depth 8 inches |
|---|---|---|---|---|
| 5 | -69.3 | -65.4 | -84.8 | -82.2 |
| 10 | -61.8 | -75.5 | -92.4 | -102.8 |
| 15 | -73.9 | -89.3 | -96.6 | -106 |
| 20 | -78.1 | -94 | -90 | -93.3 |
| 25 | -78.3 | -82 | -92.2 | -97.6 |
| 30 | -66.2 | -93.2 | -99.1 | -105 |

FIG. 20: RSSI vs. Distance

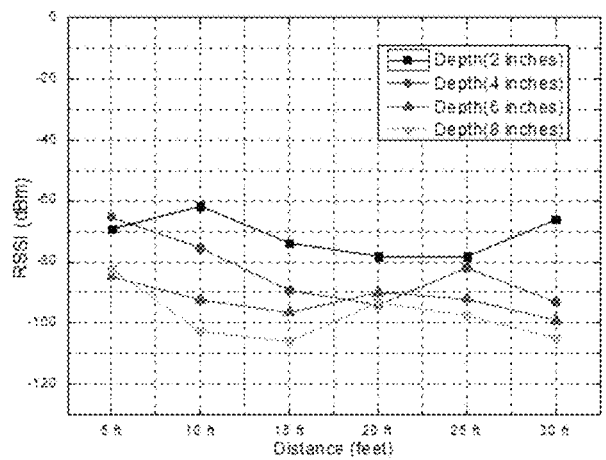
FIG. 21: RSSI vs. Distance at 868 MHz, Bit Rate of 50 kbps, vertically oriented Antenna.

| Distance (feet) | RSSI (dBm) at depth 2 inches | RSSI (dBm) at depth 4 inches | RSSI (dBm) at depth 6 inches | RSSI (dBm) at depth 8 inches |
|---|---|---|---|---|
| 5 | -72.7 | -67 | -85.5 | -84.6 |
| 10 | -75.7 | -77.3 | -94.2 | -105.3 |
| 15 | -78.1 | -94 | -95.5 | -104.1 |
| 20 | -81.2 | -98.2 | -92.3 | -99.7 |
| 25 | -83.1 | -85.4 | -94.6 | -99.8 |
| 30 | -88.5 | -93.1 | -100.2 | -120 |

FIG. 22: RSSI vs. Distance

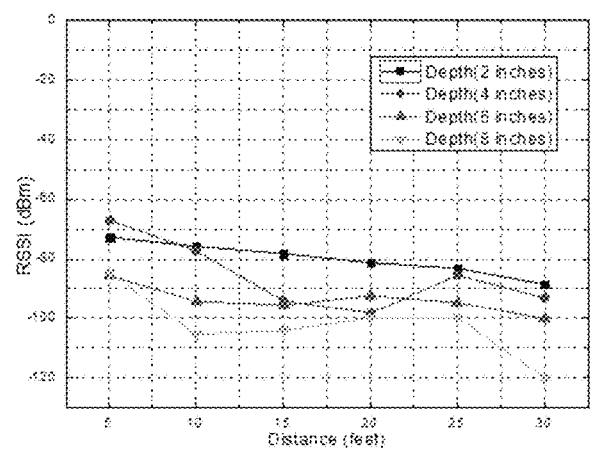
FIG. 23: RSSI vs. Distance at 868 MHz, Bit Rate of 100 kbps, vertically oriented Antenna.

| Distance (feet) | RSSI (dBm) at depth 2 inches | RSSI (dBm) at depth 4 inches | RSSI (dBm) at depth 6 inches | RSSI (dBm) at depth 8 inches |
|---|---|---|---|---|
| 5 | -71.9 | -64 | -82.7 | -82.3 |
| 10 | -61.1 | -74.2 | -91.3 | -120 |
| 15 | -74.4 | -89.7 | -93 | -120 |
| 20 | -74.6 | -83.8 | -89.9 | -96.2 |
| 25 | -80.8 | -81 | -91.9 | -120 |
| 30 | -65.8 | -68.7 | -120 | -120 |

FIG. 24: RSSI vs. Distance

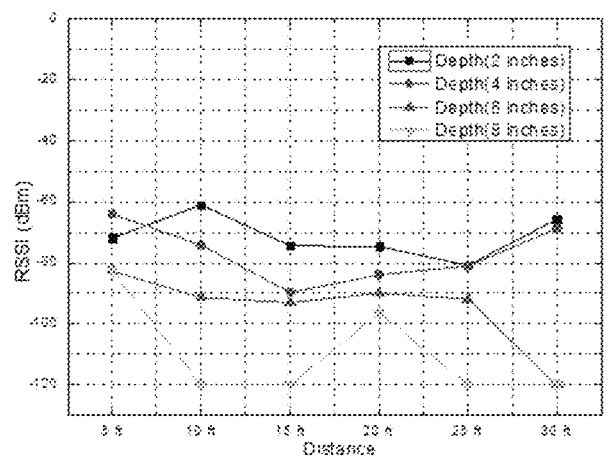
FIG. 25: RSSI vs. Distance at 868 MHz, Bit Rate of 500 kbps, vertically oriented Antenna.

| Distance (feet) | RSSI (dBm) at depth 2 inches | RSSI (dBm) at depth 4 inches | RSSI (dBm) at depth 6 inches | RSSI (dBm) at depth 8 inches |
|---|---|---|---|---|
| 5 | -53.3 | -56.5 | -59.4 | -56.9 |
| 10 | -73.4 | -75.9 | -84 | -85.4 |
| 15 | -71.4 | -83.8 | -90.7 | -99.8 |
| 20 | -71.7 | -84.5 | -92.56 | -94 |
| 25 | -73.4 | -78.2 | -89.7 | -90.7 |
| 30 | -78 | -77.7 | -83.3 | -90.3 |

FIG. 26: RSSI vs. Distance

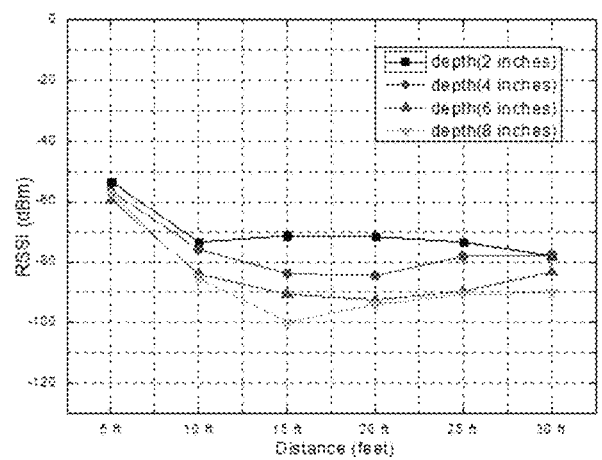
FIG. 27: RSSI vs. Distance at 434 MHz, Bit Rate of 50 kbps, vertically oriented Antenna.

| Distance (feet) | RSSI (dBm) at depth 2 inches | RSSI (dBm) at depth 4 inches | RSSI (dBm) at depth 6 inches | RSSI (dBm) at depth 8 inches |
|---|---|---|---|---|
| 5 | -56.1 | -58.5 | -61.3 | -58.9 |
| 10 | -58.4 | -78.5 | -86.3 | -87.5 |
| 15 | -63 | -89.7 | -92.1 | -100.9 |
| 20 | -69.4 | -86.8 | -94.4 | -95.9 |
| 25 | -71.9 | -80.7 | -92.8 | -92.6 |
| 30 | -76.5 | -80.2 | -90.5 | -94.8 |

FIG. 28: RSSI vs. Distance

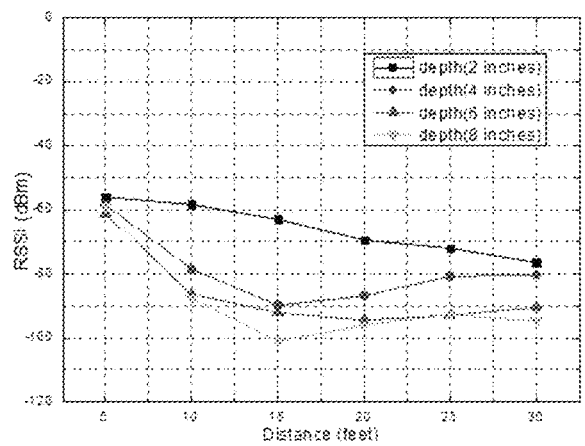
FIG. 29: RSSI vs. Distance at 434 MHz, Bit Rate of 100 kbps, vertically oriented Antenna.

| Distance (feet) | RSSI (dBm) at depth 2 inches | RSSI (dBm) at depth 4 inches | RSSI (dBm) at depth 6 inches | RSSI (dBm) at depth 8 inches |
|---|---|---|---|---|
| 5 | -53.3 | -55.9 | -58.6 | -56.4 |
| 10 | -70.6 | -75 | -82.8 | -85.6 |
| 15 | -71 | -85.3 | -85.3 | -120 |
| 20 | -69.5 | -83.9 | -89 | -93.3 |
| 25 | -72 | -77.4 | -88.9 | -89.5 |
| 30 | -75.5 | -78.5 | -81.6 | -91.9 |

FIG. 30: RSSI vs. Distance

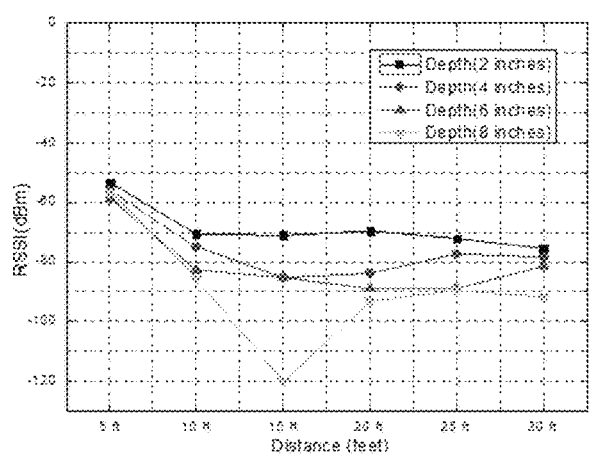
FIG. 31: RSSI vs. Distance at 434 MHz, Bit Rate of 500 kbps, vertically oriented Antenna.

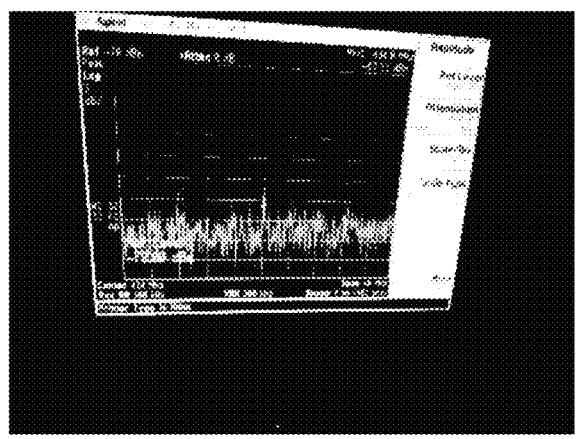
FIG. 32: Test of 434 MHz frequency using spectrum analyzer

| Distance (feet) | RSSI (dBm) at depth 2 inches | RSSI (dBm) at depth 4 inches | RSSI (dBm) at depth 6 inches | RSSI (dBm) at depth 8 inches |
|---|---|---|---|---|
| 5 | -48.7 | -55.4 | -56.5 | -56.4 |
| 10 | -50.3 | -60.5 | -61.4 | -62 |
| 15 | -51 | -64.8 | -65.8 | -78.3 |
| 20 | -63 | -80.2 | -77.2 | -79 |
| 25 | -73.1 | -83 | -79.3 | -78.2 |
| 30 | -80 | -76.7 | -79.9 | -79.3 |

FIG. 33: RSSI vs. Distance

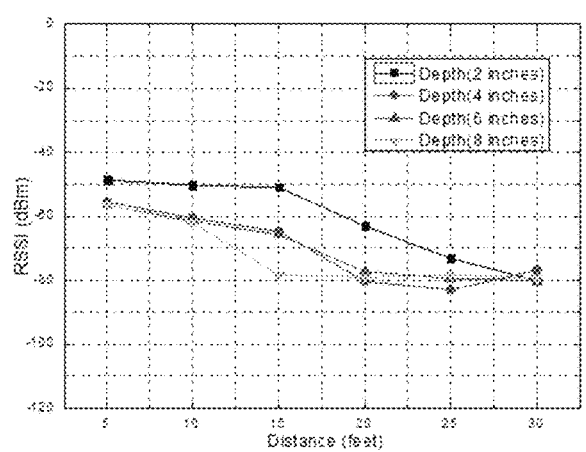
FIG. 34: RSSI vs. Distance at 169 MHz, Bit Rate of 1.2 kbps, vertically oriented Antenna.

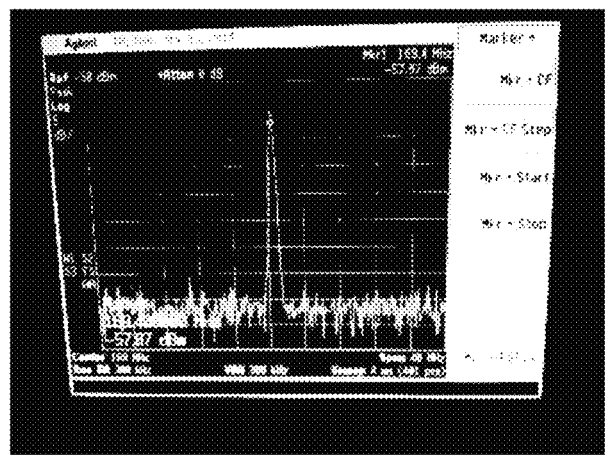
FIG. 35: Test of 169 MHz signal using spectrum analyzer

| Distance (feet) | RSSI (dBm) at 868 MHz | RSSI (dBm) at 434 MHz | RSSI (dBm) at 169 MHz |
|---|---|---|---|
| 5 | -72.7 | -56.1 | -48.7 |
| 10 | -75.7 | -58.4 | -50.3 |
| 15 | -78.1 | -63 | -51 |
| 20 | -81.2 | -69.4 | -63 |
| 25 | -83.1 | -71.9 | -73.1 |
| 30 | -88.5 | -76.5 | -80 |

FIG. 36: RSSI vs. Distance

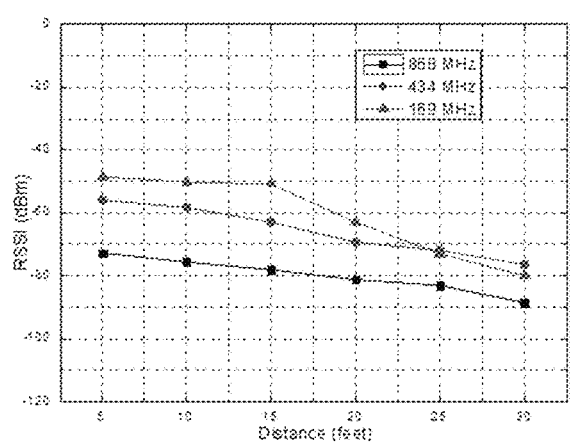
FIG. 37: RSSI vs. Distance at frequencies, 169, 434, 868 MHz

| Distance (feet) | RSSI (dBm) at 868 MHz | RSSI (dBm) at 434 MHz | RSSI (dBm) at 169 MHz |
|---|---|---|---|
| 5 | -55.5 | -52.7 | -50.7 |
| 10 | -70 | -58 | -55.4 |
| 15 | -73.6 | -54.3 | -58 |
| 20 | -67.3 | -60.6 | -60.2 |
| 25 | -60.7 | -60 | -60.3 |
| 30 | -70.4 | -66 | -65.6 |

FIG. 38: RSSI vs. Distance

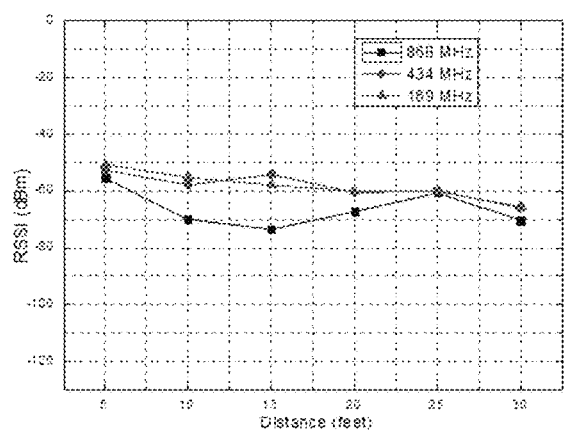
FIG. 39: RSSI vs. Distance at frequencies, 169, 434, 868 MHz

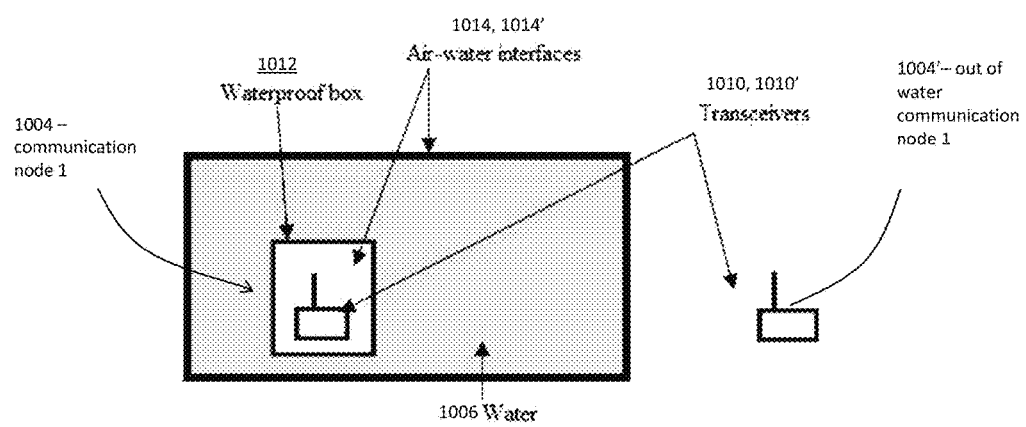
FIG. 40: Water-to-Air communication link setup

| Distance (feet) | RSSI (dBm) |
|---|---|
| 15 | -51 |
| 30 | -51.4 |
| 45 | -51.8 |
| 60 | -52 |
| 100 | -55 |
| 160 | -63 |

FIG. 41: RSSI vs. Distance

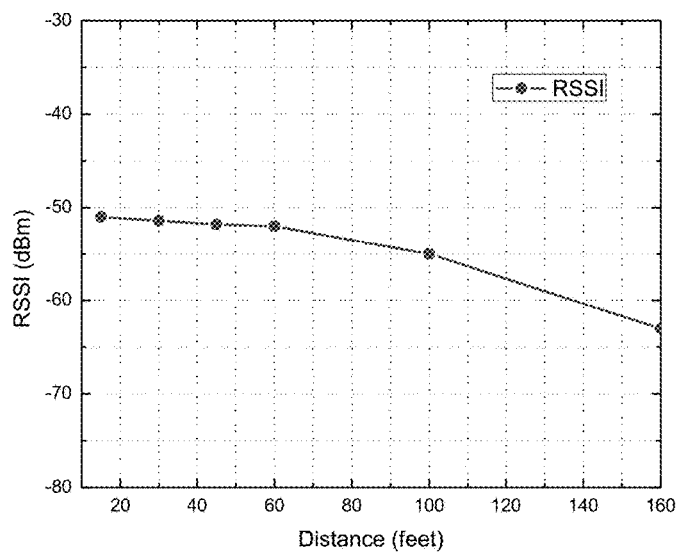
FIG. 42: RSSI vs. Distance at frequency of 169 MHz

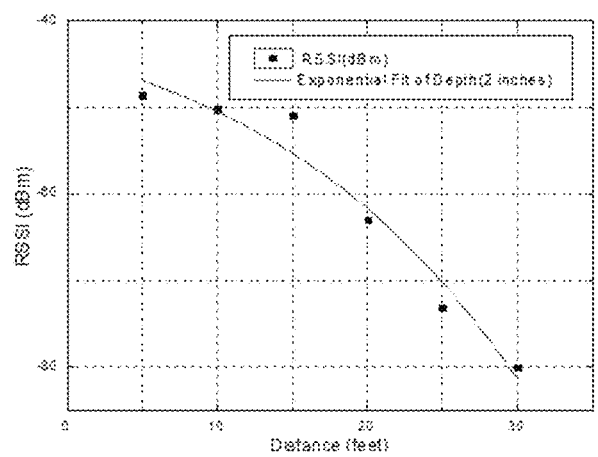
FIG. 43: Curve fitting of 169 MHz practical measurements

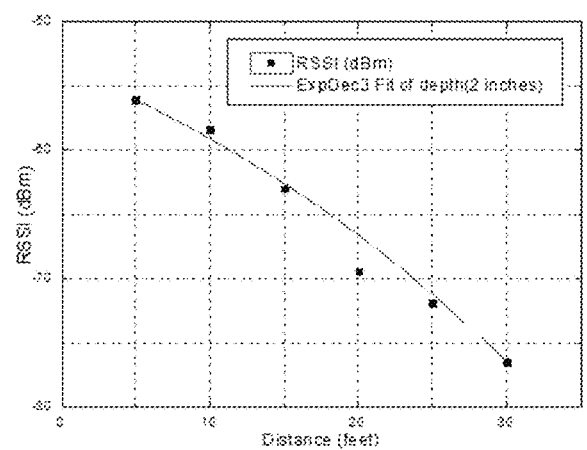
FIG. 44: Curve fitting of 434 MHz practical measurements

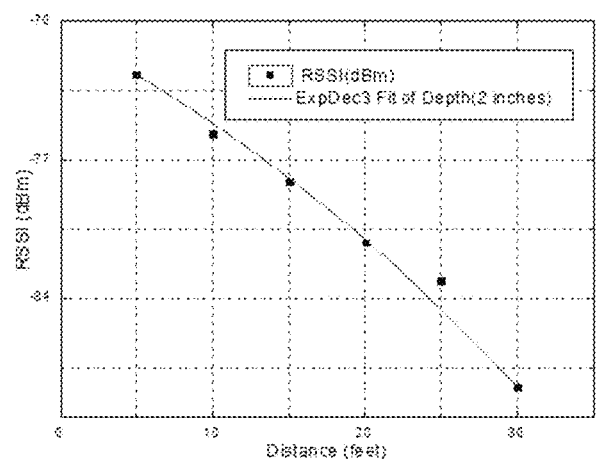
FIG. 45: Curve fitting of 868 MHz practical measurements

| Frequency (MHz) | Equation |
|---|---|
| 868 | $RSSI = -53 - 17.55 * e^{(0.0235*d)}$ |
| 434 | $RSSI = -35.7 - 17.76 * e^{(0.0277*d)}$ |
| 169 | $RSSI = -36 - 8.22 * e^{(0.057*d)}$ |

FIG. 46: Mathematical model for different frequencies

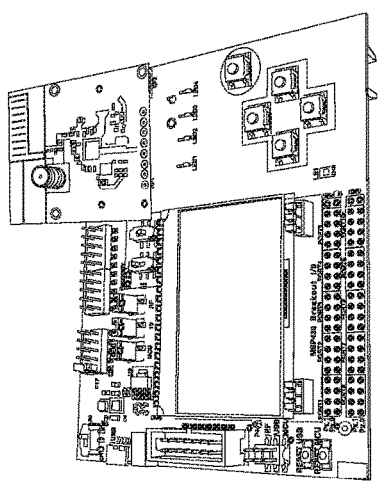
FIG. 47
FIG. 48
FIG. 49
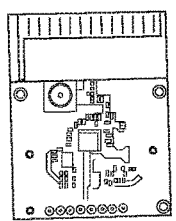
FIG. 50

SYSTEMS AND METHODS FOR UNDERWATER WIRELESS RADIO-FREQUENCY COMMUNICATIONS

RELATED APPLICATIONS

This application claims priority from the U.S. patent application No. 62/031,984, filed Aug. 1, 2014 entitled "SYSTEMS AND METHODS FOR UNDERWATER WIRELESS RADIO-FREQUENCY COMMUNICATIONS", the disclosure of which is incorporated herein, in its entirety, by reference.

FIELD

The described embodiments relate generally to underwater wireless radio-frequency communications systems and methods, and associated channel characteristics of underwater wireless radio-frequency communications networks

BACKGROUND

Traditionally, underwater communication has often been achieved via two techniques; acoustic communication and optical links (See references [1]-[5]).

Underwater acoustic communication usually involves sending and receiving signals below water using sound waves. There are several ways of effecting such communication; a common way uses hydrophones. A hydrophone may be a microphone designed to be used underwater for recording or listening to underwater sound. Most hydrophones are based on a piezoelectric transducer that generates electricity when subjected to a pressure change. Typical frequencies associated with underwater acoustics are between 10 Hz and 1 MHz. A main advantage of using sound waves is that they can travel long distances underwater (up to 20 km) without being significantly distorted. On the other hand, a main disadvantage with this technique is that data cannot be sent with high data rates, and does not fulfill requirements of many applications; additionally, there are problems relating to multipath interference, fading, and long propagation delay (See References [1],[6], and [7]).

Another commonly-used technique for underwater communication involves the use of light waves. Visible light communication ("VLC") uses visible light between 400 and 800 THz (780-375 nm). A main advantage of VLC is that it can provide higher data rates than acoustic communication, but at the cost of useful transmission distance. Typical ranges for optical modems underwater are in the single meters, and up to tens of meters, if high transmission power is used. This may be partly due to the scattering of light underwater during VLC, as well as the brightness of ambient light, which can be orders of magnitude more intense than the transmitter's signal. Accordingly, to achieve long range VLC, the cost may be quite high. Not only are tens of Watts of additional transmission power needed, but also, the cost of a providing a receiving photodiode with high sensitivity can increase cost up to three orders of magnitude. Furthermore, line of sight between the signal transmitter and receiver is required for communication, as well as high visibility in the water to reduce scattering and increase range.

While acoustics is a preferred modality, since it offers ranges greater than a few meters, optics is still used for wireless sensor networks that can hop short distance to achieve an underwater network.

With respect to the use of electromagnetic (EM) waves in the radio-frequency ("RF") range for underwater wireless communications systems, underwater communication systems based on EM waves have been proposed before and a few studies tackling this field are available (See References [8]-[11]).

A challenge faced today for underwater wireless RF communications is sending data through RF signals from one point to another without packet loss. RF communication has many advantages, but it suffers significant attenuation when used in underwater communication; for example, wave amplitude decreases rapidly in a short distance.

SUMMARY

In accordance with an aspect of an embodiment of the invention there is provided a method for providing a fountain display, the method comprising: providing a plurality of communication nodes; submerging the plurality of communication nodes within a liquid; providing a plurality of fountain components for providing a plurality of fountain jets of liquid, each fountain component being linked to a communication node in the plurality of communication nodes and being operable to provide a fountain jet of liquid in the plurality of fountain jets of liquid; transmitting a plurality of fountain control signals through the liquid to the plurality of communication nodes to control the plurality of fountain jets by communicating to each communication node in the plurality of communication nodes an associated fountain control signal for controlling the fountain component linked to that communication node, wherein the plurality of fountain control signals are transmitted at a frequency in the range of 100 MHz to 1.2 GH; and controlling the plurality of fountain jets based on the plurality of fountain control signals.

In accordance with an aspect of an embodiment of the invention there is provided a fountain system. The fountain system comprises a plurality of communication nodes, each communication node being configured to operate when submerged in a liquid; and a plurality of fountain components for providing a plurality of fountain jets of liquid, each fountain component being linked to a communication node in the plurality of communication nodes and being operable to provide a fountain jet of liquid in the plurality of fountain jets of liquid. The plurality of communication nodes are operable to receive a plurality of fountain control signals transmitted through the liquid. The plurality of communication nodes are operable to control the plurality of fountain jets by communicating to each communication node in the plurality of communication nodes an associated fountain control signal for controlling the fountain component linked to that communication node. The plurality of fountain control signals are transmitted at a frequency in the range of 100 MHz to 1.2 GH.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment and the figures will now be briefly described.

FIG. 1, in a table, shows calculations of signal wavelength in air (outside the water) and the corresponding value when a signal is propagating inside the water for the three selected frequencies used in experimental trials.

FIGS. 2-3, 5-10, 12 and 14 in block diagrams, illustrate variants of embodiments comprising multiple communication nodes.

FIGS. 4 and 11 in block diagrams, illustrate variants of communication nodes in accordance with embodiments.

FIGS. 18-19, in schematic views, illustrate experimental components for testing underwater wireless communications between communication nodes.

FIGS. 20-25 illustrate signal transmission at 868 MHz and at different bit rates.

FIGS. 26-31 illustrate signal transmission at 434 MHz and at different bit rates.

FIG. 32 illustrates the received signal strength at 434 MHz.

FIGS. 33-34 illustrate signal transmission at 169 MHz.

FIG. 35 illustrates the received signal strength at 169 MHz.

FIGS. 36-37 illustrate the Received Signal Strength Indicator (RSSI) for the three frequencies at a depth of 2 inches with vertical orientation antenna and distances of up to 30 feet.

FIGS. 38-39 illustrate the Received Signal Strength Indicator (RSSI) for the three frequencies at a depth of 2 inches with horizontal orientation antenna and distances of up to 30 feet.

FIG. 40 illustrates an experimental setup establishing a wireless communication link to send an RF signal from a node in water to a node in air, and vice versa.

FIGS. 41 and 42 show experimental results for the setup of FIG. 40.

FIGS. 43-45 show the curve fitting of measurements at the frequencies 169, 434, and 868 MHz respectively using a mathematical equation derived using curve fitting techniques.

FIG. 46 lists the frequencies and their corresponding derived equations.

FIGS. 47-57 provide images of the devices and components used in the experimental trials experiment

DESCRIPTION OF EXEMPLARY EMBODIMENTS

Figure 13:
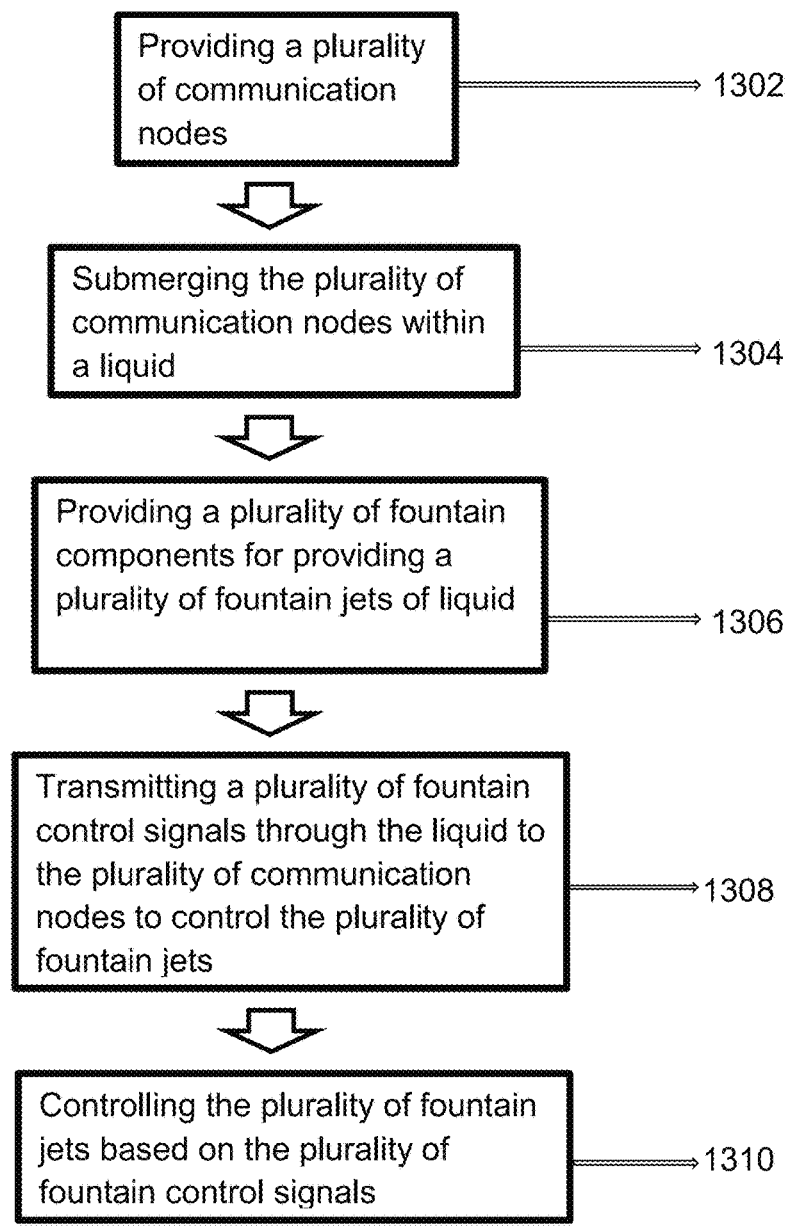
FIG. 13 illustrates a method for providing a fountain display in accordance with an aspect of an embodiment.
Figure 14:
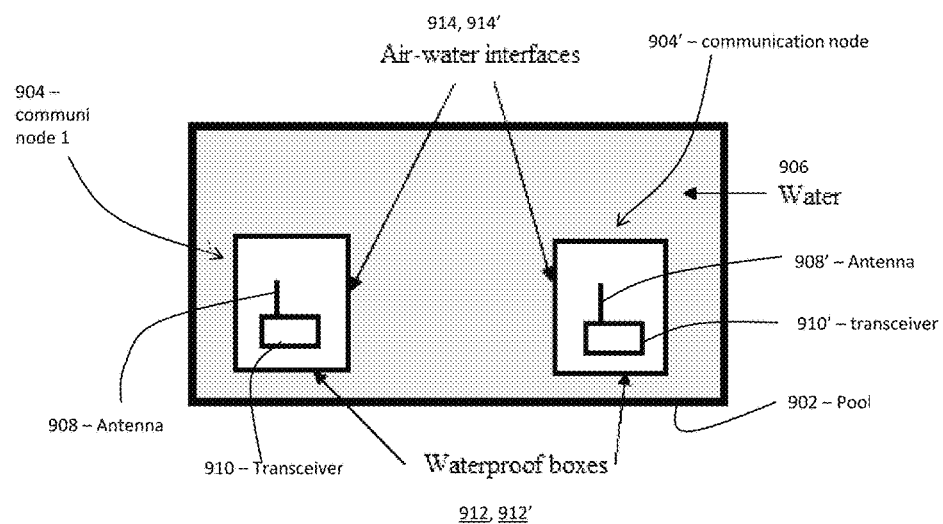
Figure 15:
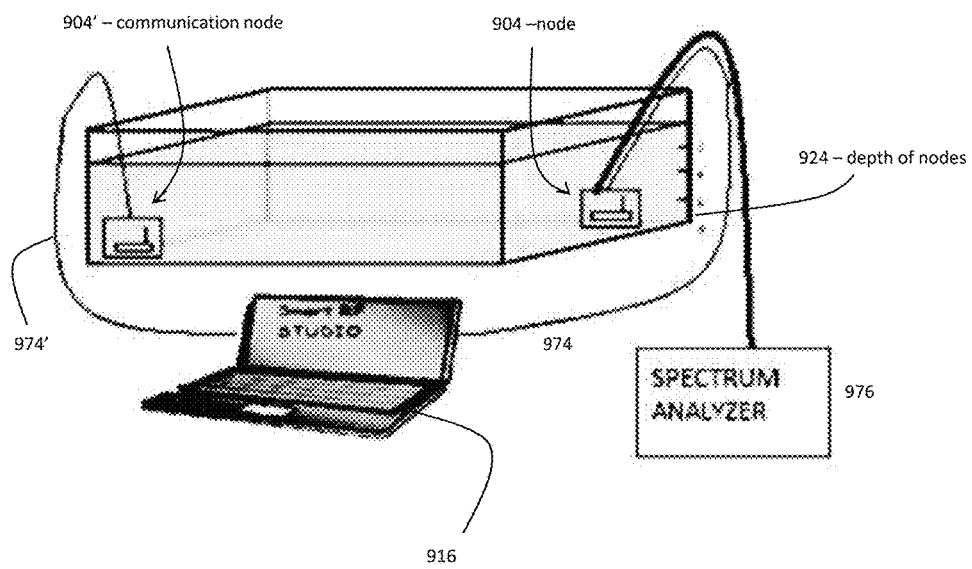
FIGS. 15-17, in schematic views, illustrate experimental setups for testing underwater wireless communications between communication nodes.
Figure 16:
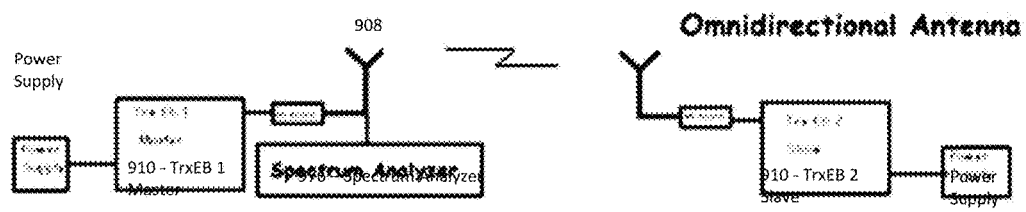
Figure 17:
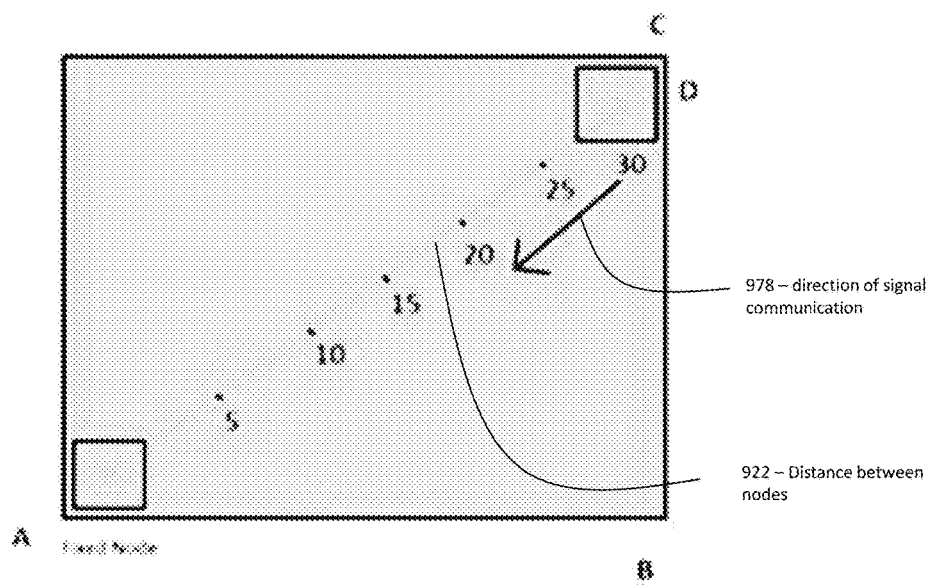

Various devices, systems and methods will be described below to provide an example of at least one embodiment of claimed subject matter. No embodiment described below limits any claimed subject matter and any claimed subject matter may cover devices, systems and methods that differ from those described below. The claimed subject matter is not limited to devices, systems and methods having all of the features of any one device, system or method described below or to features common to multiple or all of the devices, systems and methods described below. Any subject matter that is disclosed in a device, system, or method described below that is not claimed in this document may be the subject matter of another protective instrument, for example, a continuing patent application, and the applicants, inventors, or owners do not intend to abandon, disclaim, or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. Further, analogous features may be indicated by reference numerals having a predetermined numerical variance, such as a multiple of 100. For example, reference numeral (104) may designate an analogous element to an element referred to with reference numeral (204). Analogous elements may be similar in many respects, but different in some specific aspects, as may be indicated. Further, an apostrophe ('), or several apostrophes ("), following a reference numeral may indicate an analogous or related element. For brevity, where there are no relevant differences between analogous elements, the description of the operation of these elements may not be repeated.

In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

It should be noted that terms of degree such as "substantially", "about" and "approximately" as used herein mean a reasonable amount of deviation of the modified term such that the end result is not significantly changed. These terms of degree should be construed as including a deviation of the modified term if this deviation would not negate the meaning of the term it modifies.

Furthermore, the recitation of any numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation up to a certain amount of the number to which reference is being made if the end result is not significantly changed.

The embodiments of the systems and methods described herein may be implemented in hardware or software, or a combination of both. Some embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, mobile telephone, smartphone or any other computing device capable of being configured to carry out the methods described herein. Each software program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a non-transitory computer readable storage medium (e.g. read-only memory, magnetic disk, optical disc). The storage medium so configured causes a computer to operate in a specific and predefined manner to perform the functions described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Theoretical Basis for Underwater Communication

Wireless communication channel characteristics in air are well defined compared to wireless channel characteristics for underwater communications. While a significant numbers of studies are commonly available for wireless communications in free space or in the atmosphere; few studies have been conducted to date for underwater RF wireless communications.

Generally, a wireless channel may be characterized by four parameters, which vary depending on the type of the medium through which wireless signals in the channel are propagated. These four parameters are: 1) Permeability, $\mu$, in Henry/m, 2) Permittivity $\in$ in Farad/m, 3) Conductivity, $\sigma$, in Siemens/m, and 4) Volume Charge Density, $\rho$, in Coulomb/m$^3$ (See Reference [8]).

A transmitted electromagnetic (EM) wave, when propagated through a medium, is attenuated within the medium of propagation in relation to a propagation constant. The propagation constant is expressed as follows:

$$\gamma = \pm\sqrt{j\omega\mu(\sigma+j\omega\in)} \quad (1)$$

$$\gamma = \alpha + j\beta \quad (2)$$

Where $\alpha$ is the Attenuation constant and $\beta$ is the Phase constant and where $\alpha$ is in Neper/m, $\alpha$ is expressed as:

$$\alpha = \omega\sqrt{\frac{\mu\varepsilon}{2}\left[\sqrt{1+\left(\frac{\sigma}{\omega\varepsilon}\right)^2}-1\right]} \quad (3)$$

$$1 \text{ Neper} = 20\log_{10}e = 8.686 \text{ dB} \quad (4)$$

In dB units, where d is the depth of propagation inside water, a is expressed as follows:

$$\alpha_p = 10\log_{10}(e^{-2\alpha d}) \quad (5)$$

The phase constant $\beta$, when expressed in radians/m, is expressed as follows:

$$\beta = \omega\sqrt{\frac{\mu\varepsilon}{2}\left[\sqrt{1+\left(\frac{\sigma}{\omega\varepsilon}\right)^2}+1\right]} \quad (6)$$

$$\omega = 2\pi f \quad (7)$$

When an electromagnetic wave passes through one medium to another medium some part of EM wave can be reflected back from the interface. This loss is referred to as interface loss. Interface loss is constant for a particular frequency and effectively independent of propagation distance. Where f is the frequency in Hz and a is the fresh water conductivity in S/m, interface loss can be calculated as follows (see References [8] and [11]):

$$\text{Interface Loss (dB)} = -20\log\left[\left(\frac{7.4586}{10^6}\right)*\sqrt{\frac{f}{\sigma}}\right] \quad (8)$$

Attenuation of RF signals in a medium increases both with increase in conductivity and increase in frequency. It can be calculated from the following formula:

$$\text{Attenuation, } \alpha, \text{ (or propagation loss) (dB/m)} \approx 0.0173\sqrt{f\sigma} \quad (9)$$

Water in its pure form is an insulator (with high resistivity), but as found in its natural state (e.g. in tap water), it contains dissolved salts and other matter which makes it a partial conductor. Higher conductivity of water leads to greater attenuation of radio signals which pass through it. Conductivity (a) varies with both salinity and temperature (See References [3], [12], and [13]).

Underwater communication is affected by permittivity and conductivity of the water. Freshwater has a typical conductivity of 0.01 S/m, which is approximately 400 times less than the typical conductivity of seawater (4 S/m). Therefore, EM wave propagation can be more efficient in freshwater than in seawater. Freshwater is characterized as a low loss medium.

Signal loss is lessened where underwater communication is carried out at short distances (See Reference [13]).

Where c is the dielectric permittivity, and $\mu$ is the magnetic permeability (whose value has no significant changes for most non-magnetic media), the propagation speed in freshwater ($v_{FW}$) can be expressed as (See Reference [14]):

$$v_{FW} \approx \frac{1}{\sqrt{\varepsilon\mu}} \quad (10)$$

The dielectric permittivity $\in$ can further be expressed as the product of the permittivity in air, $\in_o$, which is the absolute permittivity ($=8.854\times10^{-12}$ F/m), and the dimensionless relative permittivity, $\in_r$, (also known as the dielectric constant). Since $\in_r$ for water (saline and fresh alike) is about 81, the speed of underwater EM waves is slowed down by only a factor of 9 of the speed of light in free space. The speed of underwater EM waves is thus much faster than the speed of underwater acoustic waves (which is 1500 m/s), and poses no significant problem in channel latency.

FIG. 1 shows calculations of signal wavelength in air (outside the water) and the corresponding value when a signal is propagating inside the water for the three selected frequencies used in experimental trials described in more detail below. It is evident that wavelength is shorter in water compared to its value in free space or air.

Where $\sigma$ is the electric conductivity in S/m, the attenuation coefficient (or constant), $\alpha$, for EM propagation in freshwater can be approximated as (See Reference [13]):

$$\alpha \approx \frac{\sigma}{2}\sqrt{\frac{\mu}{\varepsilon}} \quad (11)$$

In the case of freshwater, the attenuation coefficient is thus essentially frequency-independent (unlike the case of seawater, see Equation 9), and EM waves can literally propagate through freshwater body Underwater Communications Systems and Methods Referring now to FIGS. 2, 3 and 4, shown therein is an embodiment of a system for underwater wireless communications (100). In the illustrated embodiment, wireless communication nodes (104),(104') are submerged within fluid or liquid (106), contained in a fluid storage vessel (102). The nodes (104),(104') are positioned within enclosures (112),(112'). The nodes (104),(104') may be submerged at a predetermined depth (124) within the fluid storage vessel, as measured from a surface of the fluid (120) downwardly toward the node (to the top of the antenna), i.e. in a direction in-line with gravity. The nodes (104),(104') can be positioned in the vessel (102) such that there is a predetermined distance (122) between them.

As shown particularly in FIG. 3, each of the nodes (104),(104') comprises various hardware elements, including an antenna (108), a transceiver (110), and a power module (134).

Though the system (100) is illustrated and described herein as comprising nodes (104),(104'), it will be understood that the system (100) (and systems described below) may, and typically will, comprise additional nodes. Accordingly, the system (100) may comprise a plurality of wireless radio-frequency communications nodes (104),(104') . . . (104"), n being an integer greater than 2. Typically, n will be an integer considerably greater than 2, such as 10 or 100. In the following, the plurality of nodes may be generally referred to as the nodes (104).

In various embodiments, the depth (124) may be between 2 inches and 8 inches. In some embodiments, the depth (124) may be greater than 8 inches or less than 2 inches. In some embodiments, the depth (124) may be approximately any one of 2 inches, 4 inches, 6 inches or 8 inches. In some embodiments, the nodes (124) may be located at different depths. For example, a node (100) may be positioned at a depth (124) of 2 inches, and a node (100') may be located at a depth of 4 inches.

In various embodiments, the distance between nodes (112) may be between 5 and 30 feet. In some embodiments, the distance (112) may be greater than 30 feet or less than 5 feet. In some embodiments, the distance between nodes (112) may approximately any one of 5 feet, 10 feet, 15 feet, 20 feet, 25 feet or 30 feet.

Fluid storage vessel (102) may be a vessel for containing a liquid, such as water. For example, fluid storage vessel (102) may be a pool, a lake, a basin at the base of a fountain, or another type of vessel that contains water. In some embodiments, the vessel may contain water having minimal quantities of impurities, such as dissolved salts. In some embodiments, the vessel may contain freshwater and/or tap water. In some embodiments, the vessel may contain a fluid having similar physical characteristics as freshwater and/or tap water, such as physical characteristics relating to dielectric permittivity, magnetic permeability, and electric conductivity. These and other physical characteristics are discussed in additional detail above in the section titled "Theoretical Basis for Underwater Communication".

In various embodiments, enclosure (112) may be a fluid-tight enclosure when submerged at predetermined depths within vessel (102). Accordingly, when the enclosure comprising node (104) is submerged at a predetermined depth (124) within vessel (102), only insignificant quantities of fluid (128) may leak into enclosure (112). In various embodiments, enclosure (112) has a larger internal volume than the total volume of the elements of node (100) such that the total volume of the assembled elements of node (104) can fit within the enclosure (112). Enclosure (112) may be filled with air in the portion of its internal volume not occupied by the elements of node (104). Alternatively, other gases may fill the portion of enclosure (112) not occupied by the hardware elements of node (104).

In various embodiments, transceiver (110) comprises a transmitter (130) for transmitting signals via antenna (108) and a receiver (132) for receiving signals via antenna (108). In some embodiments, transceiver (110) includes one or more oscillators and a digital signal processor (DSP). The digital signal processor may be used to send and receive signals to and from antenna (108). In some embodiments, receiver (132) and transmitter (130) are connected to different antennas. In some embodiments, transceiver (110) is operable to vary signal output characteristics including signal output power, frequency, modulation scheme and/or transmission bit rate. Accordingly, in some embodiments, transceiver (110) is operable to emit signals at predetermined frequencies within radio-frequency bands, such as in the very high frequency ("VHF"), ultra-high frequency ("UHF") and industrial, scientific and medical ("ISM") frequency bands. In some embodiments the transceiver is operable to emit signals at predetermined frequencies ranging from 169 MHz to 868 Mhz. In some embodiments, the transceiver is operable to emit signals at predetermined frequencies greater than 868 MHz and/or less than 169 MHz. In some embodiments, the transceiver is operable to emit signals at any or all of 169 MHz, 434 MHz and 868 MHz (standard ISM bands). Transceiver (118) may be operable to emit signals having predetermined modulation schemes, such as OOK, 2FSK, QPSK, GMSK. Transceiver (110) may also be operable to emit signals at predetermined bit rates. In some embodiments the transceiver is operable to emit signals at predetermined bit rates ranging from 1.2 kbps to 500 kbps. In some embodiments, the transceiver is operable to emit signals at predetermined bit rates greater than 500 kbps and/or less than 1.2 kbps. In some embodiments, the transceiver is operable to emit signals at any or all of 1.2 kbps, 50 kbps, 100 kbps or 500 kbps. It will be understood that, transceiver (110) may be operable to vary other output signal characteristics than those specifically indicated. For example, it may be desirable to increase output power in the event of a data loss. In at least one embodiment, the transceiver may be a Texas Instruments™ ("TI") SmartRF Transceiver Evaluation Boards (TrxEB).

In alternate embodiments, the transceiver (110) may have at least a predetermined signal output characteristic that cannot be varied.

Various embodiments of antenna (108) are contemplated. The selected antenna may have a predetermined power gain (which may be expressed in DBi). Additionally, a directive antenna may be used, having a predetermined directional gain, in a direction of signal transmission between the nodes (104),(104'). A reflector may be included to provide signal enhancement in the direction of signal transmission between the nodes (104),(104'). Antenna orientation may also be varied to provide a directional gain. The antenna (108) may be a helical omnidirectional type antenna. The antenna may be a Larsen Antennas 169 MHz antenna. The antenna may be a Pulse Electronics IP-65 Outdoor 865 and 915 MHz Antenna, having a 2 DBi gain between 868-928 Mhz.

As illustrated in FIG. 2, air-water interfaces (114),(114') comprise regions adjacent an outer surface of enclosure (112),(112') where interface losses may occur as a signal transmitted from transceiver (110),(110) passes from air to water. Interfaces losses are described in more detail above, in the section titled "Theoretical Basis for Underwater Communication".

Referring now to FIG. 5, shown therein is an alternate embodiment of the nodes (204), which may diminish some signal losses, such as interface losses. In the illustrated embodiment, the antenna (208) of each node (204) projects outwardly from the enclosures (212). In this embodiment, if the antenna does not include an inner air cavity, interface losses may be diminished as compared to embodiments where antenna (208) is contained within enclosure (212).

As illustrated in FIGS. 2 and 4, in various embodiments each node may be connected to a control module. For example, node (104) may be connected to a control module (116) and node (104') may be connected to a control module (116'). In some embodiments, various nodes may be connected to a single control module. Control module (116) may be a processor, an ASIC, a hardware controller and the like, which can be programmed or otherwise configured to provide communication signals to transceiver (110) for transmission, and/or for receiving and processing communications signals from transceiver (110). Control module (116) may be provided with software instructions to implement certain functionality. In some embodiments, control module (116) may be a networked computing device, including a processor and memory, connected to a network for communications over the network. Optionally, the nodes 104 taken together may form a distributed computing system in that the nodes may communicate between each other to coordinate their actions, and to share processing requirement between the control modules 116 of different nodes 104.

As illustrated in FIG. 2, control module (116) may be located within enclosure (112). In some alternate embodiments—such as where control module is a networked computing device—at least part of a control module (116) may be located outside of a node's enclosure (114).

Referring to FIG. 4, control module (116) may comprise a controller (136) for controlling various components (138), (138') . . . (138"). The components (138) may be external to the enclosure (112), or may be wholly or partially enclosed therein. The components (138) may be, for example, pumps, illumination components, nozzle position controls, or valves. In various embodiments, the components (138) can be controlled by controller (136). In some embodiments, the components (138) may be hardware components of a fountain.

As described below, in some embodiments, control module (116) may receive sensor readings from sensors connected to components (138) (and/or connected to control module (116)). These sensor readings relate to operational conditions of the components.

In embodiments where components (138) comprise a pump, the pump may be connected to a flow rate sensor for generating flow rate sensor readings relating to measured output flow rate from the pump. The flow rate sensor may send the flow rate sensor readings to control module (116). Upon receiving flow rate sensor readings, control module (116) may process flow rate sensor readings in conjunction with stored application program instructions. Control module (116) may then send a pump control signal to controller (136), such that controller (136) controls the pump to vary its output flow rate.

In embodiments where components (138) comprise an illumination component, the illumination component may be connected to an illumination setting sensor for generating illumination setting sensor readings relating to a measured illumination setting of the illumination component. The illumination setting may relate, for example, to a currently output colour, intensity, position or strobe pattern of light emanating from an illumination component. The illumination setting sensor may send the illumination setting sensor readings to control module (116). Upon receiving illumination setting sensor readings, control module (116) may process illumination setting sensor readings in conjunction with stored application program instructions. Control module (116) may then send an illumination control signal to controller (136), such that controller (136) controls the illumination component to vary its illumination setting.

In embodiments where components (138) comprise a nozzle position control component, the nozzle position control component may be connected to a nozzle position sensor for generating nozzle position sensor readings relating to a measured nozzle position of a nozzle connected to nozzle control component. Nozzle position sensor readings may relate to an inclination of the nozzle and its angular orientation around a vertical axis. The nozzle position sensor may send the nozzle position sensor readings to control module (116). Upon receiving nozzle position sensor readings, control module (116) may process nozzle position sensor readings in conjunction with stored application program instructions. Control module (116) may then send a nozzle control signal to controller (136), such that controller (136) controls the nozzle position of the nozzle, with respect to its inclination and angular orientation around a vertical axis—such that the output direction of any fluid output from the nozzle may be controlled.

In embodiments where components (138) comprise a valve component, the valve component may be connected to a valve setting sensor for generating valve setting sensor readings relating to a measured state of the valve. The measured state of the valve may be for example: open, partially open or closed. The valve setting sensor may send the valve setting sensor readings to control module (116). Upon receiving valve setting sensor readings, control module (116) may process valve setting sensor readings in conjunction with stored application program instructions. Control module (116) may then send a valve control signal to controller (136), such that controller (136) controls the valve to vary its state.

It will be understood that in some embodiments, the components (138) may only send sensor readings to the control module (116) when polled by the control module (116).

Other components (138) are contemplated. Particularly, other components of fountains may be equipped with sensors and connected to a controller (136). For example, sensors can be provided to measure water level, ambient light levels, temperature, wind speed, water chemistry such as pH, position (for example a GPS sensor), and microelectromechanical system (MEMS) sensors such as pressure sensors, accelerometers, stability sensors (gyroscopes). Components of the fountain may include the following: lights, valves, pumps, frequency (VFD) drives, moving jets (which can be robot mounted for mobility), moving lights (which can also be robot mounted for mobility), air regulators, DMX relay cards (DMX is a standard for computer networks that can be used to control lighting and effects), DMX analog cards, lasers, video projectors, gobo displays, fog machines, laminar jets (a fountain feature for providing a glass-like rod of water), leaper jets (a fountain feature for providing a leaping version of this glass-like rod of water), audio systems, DMX consoles, PLC controllers and tablets.

In various embodiments, the components (138) described above may be hardware components of a fountain being controlled by control module (116). For example, the pump may provide water or other liquid output through a fountain output nozzle of fountain. The illumination component may be connected in-line with a fountain output nozzle for outputting light. In some embodiments, hardware components of various fountains may be connected to controller (136) and controlled by control module (116).

It will be understood that more than one component (138) may be comprised in a fountain. For example, a single fountain may comprise a pump component for controlling output flow rate from a nozzle, a valve component in fluid communication with the pump, a nozzle position control component for varying the position of the nozzle and a plurality of illumination components for outputting light in-line or at an angle with respect to the output from the nozzle.

It will be understood that controller (136) may be proximate to the components (138) being controlled.

It will be understood that where the components (138), the control module (116), or other elements described below, are located externally to the enclosure (112), the enclosure (112) may include an appropriate seal (not shown). The seal may be positioned where the component (138), control module (116), or other element is connected into the node (104), in order to ensure that the enclosure (112) remains sealed from fluid within vessel (102) external to the enclosure (112).

As shown in FIG. 4, the node (104) may comprise a power module (134) for powering the hardware elements of node (104), such as transceiver (110). The power module (134) may also provide power to control module (116). The power module (134) may comprise a local power source, such as a battery. In alternate embodiments, the power module may be connected to mains power. In some embodiments where the power module (134) comprises a local power source, the local power source may be a rechargeable power source—such as a rechargeable battery—and the enclosure (112) may include a charging port (not shown) for recharging the rechargeable power source. In alternate embodiments, the power source may be powered by a connected local energy supply, such as a solar panel (not shown). The local energy supply or generator may also be used to recharge any included rechargeable power source.

Though the power module is shown as being connected to transceiver (110), it will be understood that the power module may alternately be connected to control module (116). For example, in some embodiments power may be received over a connection between control module (116) and node (104) in order to power the elements of node (104).

Reference is now made to FIG. 6, which illustrates an example signal flow between two nodes (104),(104') in a wireless underwater communication system (100). In the illustrated embodiment, a signal (142a) containing instructions is sent from a control module (116) in node (104), to be received at control module (104') in node (104'). Optionally, the signal contains instructions which can be processed by a control module (116') for controlling at least one component (138), as described above. Accordingly, in the illustrated signal flow path, node (104) sends a signal, such that in the illustrated embodiment it acts as a "sending node" (144), while node (104') receives the signal from the sending node, such that it is a "receiving node" (146). It will be understood that, in some embodiments, node (104) could also receive signals from node (104') such that it acts as a receiving node (146').

In some embodiments, the signal (142a) originates at control module (116).

In some embodiments, where control module (116) comprises sensors (not shown) for generating sensor readings relating to sensed operating conditions of components (138) (or the components contain such sensors), the control module (116) may send a signal (142a) upon processing a sensor reading relating to at least one component (138) in conjunction with locally stored application program instructions. The control module (116) may send a signal (142a) in response to a sensor reading relating to at least one component (138) that falls outside of predetermined parameters for operating conditions. For example, if a sensor coupled to a component (138) including a valve detects that the valve is unable to close correctly; the control module may send a signal to other nodes in order to terminate operation of components in those other nodes.

In some embodiments, control module (116) generates a signal (142a) upon processing locally stored scheduling instructions stored in a data store or previously received in a signal sent to the control module (116). The scheduling instructions may indicate a schedule for sending signals (142a) to other control modules (116') and associated instructions for controlling components of control module (116'). The scheduling instructions may indicate a schedule for activating components (138) in nodes (116') in embodiments in which the nodes 104 taken together constitute a distributed system, there may be no external control at all. Instead, all processing and control could be handled among the nodes 104 generally, and by communications between the nodes 104. In such a distributed system, the nodes 104 could be self-configuring and could provide a self-healing network. For example, if one node 104 or one fountain component of a node were malfunctioning so that certain functionality could not be provided at that node, then the group of nodes, functioning as a distributed system, may determine another suitable node that could replace the malfunctioning node in providing the desired functionality. This desired functionality could include, for example, the capacity to receive and transmit routed messages, and could also relate to the capacity to provide certain fountain features as described above.

In some embodiments, the signal (142g) does not originate at control module (116). Control module (116) may be in network communication with an external device (164) and may forward a signal (142g) received from the external device to other nodes. The network communication may be a wired network communication.

In some embodiments, the signal (142g) may have been received at control module (116) after having been communicated through an underground communications channel from another node.

According to the illustrated signal flow in FIG. 6, signal (142a) is sent from control module (116) to transceiver (110), signal (142b) can then be sent from transceiver (110) to antenna (108)—optionally after having been processed by a DSP. The signal (142c) is then sent over an underwater radio-frequency communications channel (140) (also interchangeably referred to herein as a "signal link" throughout) to antenna (108'). The signal (142d) may then sent to transceiver (110'). The signal (142e) is then sent to control module (116'). Upon receiving the signal (142e), the control module (116') may control at least one component (138), optionally using a connected controller (136').

In some embodiments, upon receiving the signal (142e), the control module may retransmit the signal to other nodes.

In some embodiments, the control module (116'), upon receiving the signal (142e), may send a return signal (142f) to transceiver (110'), to then be communicated back through antenna (108'), communications channel (140), antenna (108) and transceiver (110) to control module (116), in order to confirm successful signal transmission. In some embodiments, if a return signal (142f) is not received at control module (116), control module (116) may attempt to resend the signal (142a).

In some embodiments, a marker signal is sent along with at least some signals transmitted over the communications channel (140). If, upon receiving the marker signal, the control module in a receiving node detects deviation beyond a predetermined threshold from expected characteristics of the marker signal, the control module (116') may be configured not to send a return signal (142f) which would confirm a successful transmission. Alternately, if, upon receiving the marker signal, the control module in a receiving node detects deviation beyond a predetermined threshold from expected characteristics of the marker sign the control module (116') may be configured to send a return signal (142f') indicating a failed signal transmission. The return signal (142f') may be sent to node (104) or to another node, or to an external device (164') connected by a network connection, such as a wired network connection.

In some embodiments, a sender identifier signal is sent along with at least some signals transmitted over the communications channel (140). According to such embodiments, each node may have a unique identifier that may be reflected in an identifier signal. Upon receipt of a sender identifier signal at a receiving node, the sender identifier signal may be processed by a control module in a receiving node, in order to identify the sending node.

In further embodiments, where each node may be associated with a unique identifier, a sending node (144) may send a different signal to different receiving nodes (146) . . . (146"). Alternately, a sending node (144) may send a signal comprising instructions, wherein only parts of the instructions will be applicable to each receiving node. The instructions may comprise node identifiers of predetermined receiving nodes, such that upon receiving the instructions, the receiving nodes can identify which instructions should be stored and processed locally.

In some embodiments, a control module (116) of a sending node (144) may modify a signal in response to characteristics of a predetermined receiving node (146). The characteristics may relate to the specific components (138) of the receiving node (146). For example, where a signal (142a) comprises instructions to close a valve, the instructions may be varied depending on the type of pump connected to the control module (116') of the receiving node. The characteristics may be locally stored at a data store in control module (116), or may be received at control module (116) along with a signal (142g) from an external device or from another node. In some embodiments, control module (116) may request node characteristics from a predetermined receiving node (146), before sending a signal (142a), by sending an instruction requesting node characteristics. Alternately, control module (116) may request node characteristics from an external controller.

In some embodiments, instructions included in signals transmitted between nodes (104) may be encrypted prior to being sent from a sending node. In such embodiments, a public-private key cryptographic system may be implemented, according to which each node is assigned a mathematically-linked public and private key. All of the nodes may be provided with the public keys of other nodes. Instructions may be encrypted by the control module of a sending node, prior to being transmitted, using the public key of an intended receiving node. The instructions can then be decrypted by the receiving node, by processing the instructions with the receiving node's public key. This ensures that only the intended receiving node may decrypt the instructions of a received signal. Further, the sending node can provide a digital signature of the instructions being sent to a receiving node. To provide a digital signature, the sending node may process the instructions to be included in a signal, using the sending node's private key. The receiving node, upon receiving the digital signature, can process the digital signature using the sending node's public key. The receiving node can then compare the processed digital signature result with the instructions received, in order to ensure that the instructions were in fact sent from a known node.

The communications channel (140) may have specific channel characteristics in order to ensure that any attenuation of a signal communicated over the channel (140) will not result in packet loss. Specifically, channel characteristics may be chosen to ensure a signal level of a signal received over communications channel (140) is not less than −90 dB with respect to a transmitted signal, in order to avoid packet loss. Channel characteristics comprise signal output characteristics used by the transceivers (110),(110') in the communications channel (140). Accordingly, the signal (142c) may be transmitted from antenna (108) to antenna (108') at a specific predetermined frequency, modulation scheme, transmission bit rate, and signal output power in order to minimize signal attenuation to ensure that the received signal level is not so attenuated as to result in packet loss. Channel characteristics may also comprise choice of antenna (108), depth (124) and distance between nodes (122). For example, antennas (108),(108') may be chosen to have a directional gain along the direction of the communications channel (140). Further, the depth (124) and distance between nodes (122) may be varied. The channel characteristics may be varied to ensure received signal level does not lead to packet loss, in view of the relationships between the above channel characteristics described in the "Experimental Results, Setup and Analysis" section below.

Referring now to FIG. 7, shown therein is a system for underwater wireless communication (300) having a master-slave control configuration. According to the illustrated embodiment, a node (304) may be designated as a dedicated master control node (350). Node (304) may be connected to a dedicated master control module (316) for sending master signals (348) to a plurality of slave nodes (350'),(350') . . . (350"), connected to slave control modules (316'), (316') . . . (316"). The system (300) allows control of components (138) connected to slave control modules (316') . . . (350") from a dedicated master control module (316).

It will be understood that in various embodiments of system (100), described above, a signal sent from a given node (104) may be received at a plurality of other nodes (104'), and may be processed in order to control components (138) connected to control modules (116'). The system (100) may be understood to comprise a distributed control configuration, wherein each node may send signals to other nodes, which may be for controlling components (138) connected to the other notes. This is to be contrasted with a master-slave configuration, where a single master node sends signals to slave nodes for controlling the components associated with the slave nodes.

Referring now to FIG. 8, shown therein is an embodiment of a system for underwater wireless communication (400) having a master-slave configuration and a distributed control configuration. According to the illustrated embodiment, a plurality of subordinate nodes (450') . . . (450") may be operable to send signals for controlling components (138) connected to control modules in other subordinates nodes (450'). In some embodiments, the subordinate nodes (450') may be operable to send signals for controlling components (138) connected to a control module (416) of a master node (450). However, a master node (450) may send a master signal (448) whose instructions are given effect such that they may supersede instructions contained in any signal previously or subsequently received from subordinate nodes (450').

In some embodiments of a system (400), a master node may be equipped with sensors (452) for detecting an unusual operation state, and may send a master signal when such a state is detected. The unusual operation state may relate to the operation of connected components (138).

Referring now to FIG. 9, shown therein is a system for underwater wireless communication (500) wherein a signal may be relayed between nodes, such that a signal 'hops' between nodes. In the illustrated embodiment, a signal (554a) is intended to be communicated to a plurality of nodes may be transmitted from a source node (504) to a first receiving node (504'). A distance between the source node (504) and a second receiving node (504") may exceed a signal transmission range (558) of source node (504), such that a signal cannot be directly sent from the source node (504) to the second receiving node (504"). Accordingly, to provide a signal to a node out of range of a source node, the signal may be provided to an intermediary node and retransmitted. As illustrated, in order to send a signal from source node (504) to a second receiving node (504') out of range (558) of source node (504), a signal can first be transmitted to a first receiving node (504') and then retransmitted to node (554"). Accordingly, upon receiving a signal, nodes may be configured to retransmit the received signal. In some embodiments, the second receiving node (504") may be positioned at a lower depth (124) than the first receiving node (504').

In alternate embodiments, instead of automatically retransmitting any received signal (554), nodes may be equipped with sensors to detect the presence of other nodes within effective signal transmission range. In such embodiments, nodes may be operable to retransmit a received signal only to a predetermined set of nodes.

In some embodiments, the nodes comprise a signal attenuation correction module (556). The signal attenuation correction module (556) may be configured to automatically repair a received signal (554a) before retransmitting it. The signal attenuation correction module (556) may thus be used to limit the cumulative attenuation of a transmitted signal that is relayed more than once between nodes. For example, upon node (504') receiving a signal (554a), signal attenuation correction module (556') may automatically increase the amplitude of the received signal before the node (556') retransmits the received signal. Other examples of this signal attenuation correction module 556 may be provided by the nodes 104 configured so as to constitute a distributed computing system. Specifically, nodes 104 may be configured to provide a mesh network configuration that can find the most reliable route for the signal, and then use other nodes as repeaters or to shorten the path of the RF link. Nodes may also be able to boost output power for certain durations to improve the RF link.

Referring now to FIG. 10, shown therein is a system (600) for water-air wireless communications. The system (600) comprises a communications node (604), positioned in enclosure (612) and submerged at a depth (124) in fluid storage vessel (602), in wireless radio-frequency communication with a surface node (604') positioned outside of the vessel (610) via an air-water radio-frequency communications channel (640').

In various embodiments, node (604') comprises a control module (616'). Control module (616') may control components (138) connected to control module (616'), and/or it may be operable to send signals to node (604) to control components (138) connected to control module (604).

In the illustrated embodiment, control module (616') is connected to a communications network (660). Accordingly, control module (604') may be a networked computing device, analogous to some embodiments of control module (116) described above. Communication network (660) may be any network or network components capable of carrying data, including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network (LAN), wide area network (WAN), a direct point-to-point connection, mobile data networks (e.g., Universal Mobile Telecommunications System (UMTS), 3GPP Long-Term Evolution Advanced (LTE Advanced), Worldwide Interoperability for Microwave Access (WiMAX), etc.), and others, including any combination of these.

In some embodiments, control module (616') may receive a signal (642g) over communications network (660) from an external device (664). The received signal (642g) may control components (138) connected to control module (616'). Alternately, upon receiving signals (662), control module (616') may retransmit signal (642g) to node (604) via communications channel (640'), either for retransmission by node (604) to additional nodes, or for controlling components (138) connected to node (604).

As described above, in various described embodiments relating to communication between submerged nodes (104), the depth (124) may be between 2 inches to 8 inches, while the distance between nodes (122) may be between 5 feet to 30 feet. Accordingly, in most described embodiments, the depth (124) will be shorter than the distance between nodes. As described in the sections "Theoretical Basis for Underwater Communication" and further in the section titled "Mathematical Model", signal loss may increase exponentially with travel distance underwater, while travel distance in air may have minimal effect. Accordingly, the system (99e) may provide decreased signal loss as compared to systems providing water-water wireless communication, because the total signal travel distance underwater may be limited to the depth of submersion of node (604) underwater.

Referring now to FIG. 11, shown therein is a diagram of an embodiment of a communication node (704) for automatically adjusting signal output characteristics from transceiver (710) in response to sensor readings. Specifically, the node (704) may be operable to automatically adjust signal output power, frequency, modulation scheme and/or transmission bit rate in response to sensor readings. The node (704) may comprise a GPS module (770), a depth sensor (768) and/or a signal strength sensor (766).

The GPS module (770) may be operable to provide a GPS sensor signal, which can be processed by control module (716) in order to indicate a location of the node (704). The control module (716) may periodically send processed GPS sensor signals to other communication nodes (716') in range. Each node (704) may thus receive processed GPS sensor signals, indicating a position of other nodes. The position of other nodes can then be processed to indicate a distance to each of the other nodes.

The depth sensor (768) may be a pressure sensor, for providing sensor readings indicating a sensed depth (124) of the node (704) in vessel (102), with respect to a fluid surface (120).

As illustrated, signal strength sensor (766) may be incorporated in the transceiver (710). Signal strength sensor (766) may provide sensor readings relating to sensed signal strength of signals received from other nodes.

During operation of the node (704), readings from GPS module (770, depth sensor (768) and signal strength sensor (766) may be received by control module (716) and processed in conjunction with stored application program instructions. After processing the sensor readings, the control module (716) may modify any of signal output power, frequency, modulation scheme and/or transmission bit rate in order to minimize packet loss during signal transmission to a receiving node. The control module (716) may vary any of the signal output characteristics in response to processing of the sensed parameters in conjunction with determined relationships between, for example, packet loss, node depth in vessel (102), distance to other nodes, signal frequency, and/or bit rate as set out in the "Experimental Results, Setup and Analysis" section below. In some embodiments, the control module (716) may automatically adjust at least one signal output characteristic in reduce the risk that a signal level of a signal received over communications channel (740) is not so attenuated as to result in packet loss. In some embodiments, the control module (716) may automatically adjust at least one signal output characteristic in order to ensure that a received signal level is not less than −90 dB with respect to a transmitted signal.

Referring now to FIG. 12, shown therein is an example signal flow between a plurality of nodes in a wireless communications system (800) comprising an air-water communications channel (840') and an underwater communications channel (840). The system comprises a surface node (804) in wireless-radiofrequency communication with nodes (804') and (804") via an air-water communications channel (840') and in communication with an external device (864) via a communications network (860) (as described in relation to FIG. 10). The system comprises a node (804''') in underwater radio-frequency communications with node (804") via communications channel (840).

In the illustrated signal flow path, node (804) sends a signal, such that in the illustrated embodiment it acts as a "sending node" (844), while nodes (804'), (804"), (804''') receive the signal from the sending node, such that they act as "receiving nodes" (846). It will be understood that, in some embodiments, node (804) could also receive signals from node (804'), (804"), (804''') such that it acts as a receiving node.

According to an illustrated signal path, an external device (864) sends a signal (842g) to node (804) over a communications network (860), the signal comprising instructions, optionally, for controlling components (138) connected to any of the nodes of the system (800). The node (804) then retransmits the signal (842a) over communications channel (840') to nodes (804') and (804"). Upon receiving the signals (842a), nodes (804') and (804") may retransmit the signal to additional nodes that may be out of signal range of node (804). As illustrated, node (804") retransmits a received signal (842a) as signal (842b) over an underwater radio-frequency communications channel (840) to node (804'''). Upon receiving the signals (842b), node (804''') may retransmit the signal to additional nodes that may be out of signal range of node (804).

Various alternate embodiments of the system (800) and flow path are contemplated, pursuant to embodiments described in more detail above.

In some embodiments, node (804) is an underwater communications node and receives signal (842g) over a wired communications network.

In some embodiments, node (804) generates signal (842a) after processing locally stored data, such as scheduling instruction.

In some embodiments, different retransmitted signals (842a'),(842a") may be sent to each of the nodes (804'), (804") from node (804), optionally depending on characteristics of the nodes (such as characteristics of any connected components), or relating to scheduling instructions received at the control module (816) in the signal (842g) or otherwise locally stored.

In some embodiments, a signal may (842a) may comprise instructions that relate to various receiving nodes, and the receiving nodes may rely on identifying information contained within the instructions in order to determine which instructions should be executed locally.

The system may also be configured as described in relation to FIGS. 7 and 8, such that node (804) serves as a master node and nodes (804'), (804"), (804''') may serve as slave nodes or distributed control nodes.

Referring to FIG. 13, there is illustrated in accordance with an aspect of an embodiment of the present invention a method 1300 for providing a fountain display. In step 1302, a plurality of communication nodes are provided. As described above, these communication nodes are, in some embodiments, sealed within an enclosure. In step 1304 the plurality of communication nodes can be submerged within a liquid. In some embodiments, this liquid will be closer to being freshwater than to being saltwater, to reduce conductivity within the liquid and thereby reduce attenuation of any signal transmitted. In step 1306, a plurality of fountain components are provided. The plurality of fountain components can provide a plurality of fountain jets of liquid. Each fountain components can be linked to a communication node in the plurality of communication nodes and can be operable to provide a fountain jets of liquid in the plurality of fountain jets of liquid. In step 1308, a plurality of control signals can be transmitted through the liquid to the plurality of communication nodes to control the plurality of fountain jets by communicating to each communication node in the plurality of communication nodes and associated control signal. This fountain control signal can be used to control the fountain component linked to that communication node. The plurality of fountain control signals can be transmitted at a frequency in the range of 500 MHz to 1.2 GHz, or at a frequency in the range of 169 MHz to 1.2 GHz, or at a frequency in the range of 434 MHz to 1.2 GHz.

Experimental Results, Setup and Analysis

Experiments were conducted to address the feasibility of sending RF signals underwater in conjunction with the various embodiments of systems for underwater communication, described above. Different propagation impairments which may affect underwater communication signals were observed.

The experiments resulted in the determination of frequency values, water depth, and communication distance that can be used to receive a transmitted RF signal successfully.

Frequencies in the very high frequency ("VHF") and ultra-high frequency ("UHF") bands were tested for underwater communications. Communications were tested, for example, at a depth of 2 inches and for a distance of up to 30 feet in different industrial, scientific and medical ("ISM") frequency bands.

Different variables, including distance between transceivers, underwater depth, frequency, and antenna orientation were varied.

The results described below explain the effects of water depth and frequency change on the signal transmission.

Experimental measurements were further used to derive a mathematical model to describe the attenuation versus distance.

Results of the experiments show the feasibility of RF communication underwater. An RF link was established at a range of 30 feet between communication nodes and at a depth of 2 inches using three frequencies 169 MHz (VHF), 434 MHz (UHF), and 868 MHz (UHF).

The effect of frequency and antenna depth on the RF channel was evaluated. Lower attenuation was found to occur at lower frequencies. Lower attenuation was also found to occur at shallower antenna depths.

Referring now to FIGS. 14-17, a setup used during the experimental trials is illustrated. Two fluid-tight enclosures (912), (912')—referred to hereafter as waterproof plastic boxes (912), (912')—containing communications nodes (904), (904') which comprise transceivers (910), (910') with antennas (908), (908'), respectively, were submerged underwater in a water storage vessel (902). The water storage vessel (902) will be hereafter referred to as "pool". The transceivers (910), (910') were placed within nodes (904) and (904) at diagonal ends of the pool, approximately 30 feet apart (see FIG. 17). The transceivers (910), (910) were fixed in the waterproof boxes (912), (912') and aligned with concrete blocks in the pool (902) to keep them submerged underwater. The transceivers (910), (910') were connected to a computing device (916) via lines (974), (974') for providing communication between the transceivers (910),(910') and the computer device (916), and for providing power to the transceivers. In the experimental trials, the lines (974), (974') were USB cables. A spectrum analyzer (976) was connected node (904) and used to observe the received signal and other frequency components.

This experimental setup likely resulted in two types of signal attenuation: (a) interface loss due to reflection at the air-water interfaces (914), (914'), and (b) propagation loss inside the water due to its material properties. The summation of the above two loss components may represent the approximate total path loss between the transmitter and the receiver in the experimental setup. Notably, the interface loss may have been approximately doubled because signals were communicated between two submerged nodes (904), (904') encapsulated in separate waterproof boxes (912), (912')—resulting in two air-water interfaces. The interface losses likely occurred in proximity to both the transmitter and the receiver (see FIG. 1 and interfaces (914), (914')). More specifically, the interface losses may have resulted from a first air-water interface (914) as a transmitted signal passed from air in a first waterproof box (912 to water (906), and a second water-air interface (914') when a transmitted signal passed from the water (906) through to the air in waterproof box (912').

In order to test RF communication underwater between the nodes (904), (904'), a pool (902) having length of 7.62 m (25 ft), breadth 7.62 m (25 ft) and depth of 0.61 m (2 ft), having surface 58.0644 m² was used. The water depth was 48.26 cm (19 inches). The walls of the pool were made-up of wood and the concrete floor. Tap water was used with dissolved bromine (4 ppm) and PH of 7.7 during the measurements at a temperature of approximately 15° C.

Upon a communication signal being transmitted from a transmitting node, Received Signal Strength Indicator ("RSSI") in dB was measured at a receiving node. The depth and distance between the nodes was varied. RSSI is a measurement of the power present in a received radio signal. RSSI signal level measurements were sent from transceivers (910), (910') over lines (974), (974') and processed and analyzed using a computing device (916) executing application program instructions from a software component.

Figure 18:
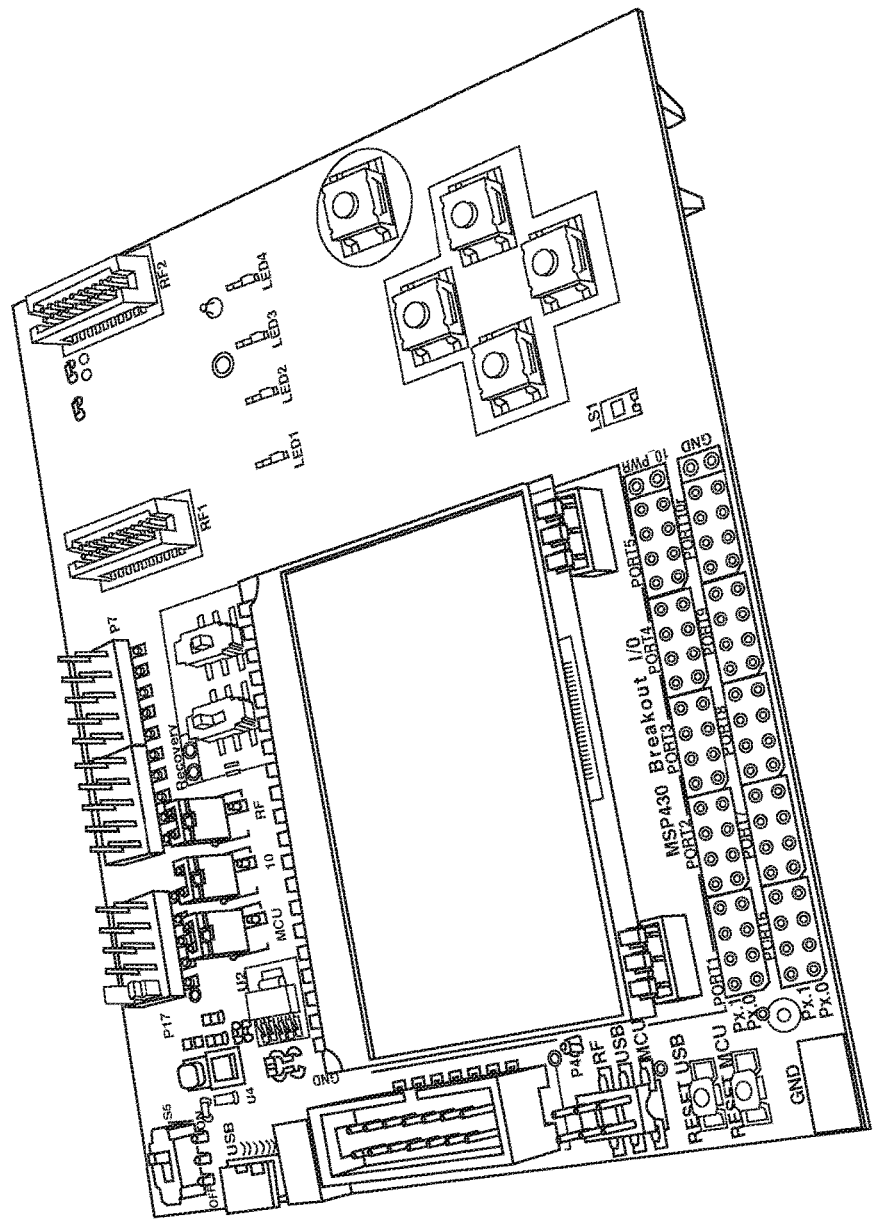
Figure 52:
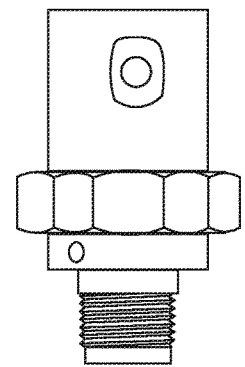
Figure 54:
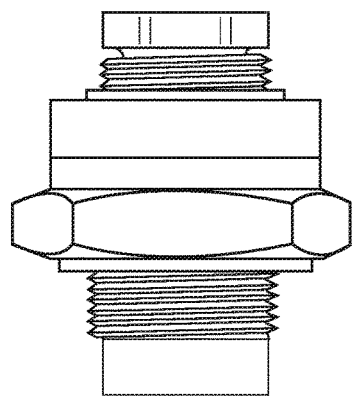
Figure 51:
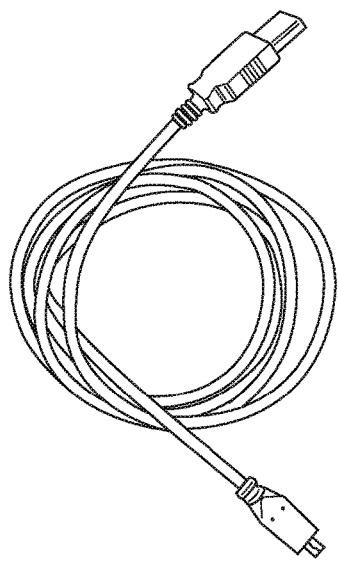
Figure 53:
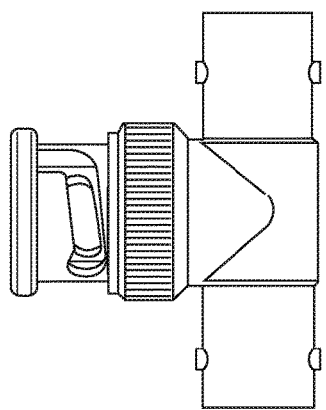
Figure 56:
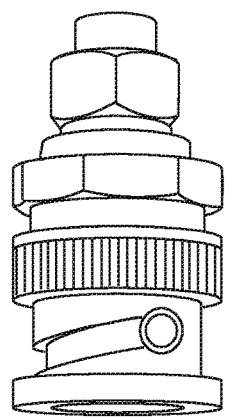
Figure 55:
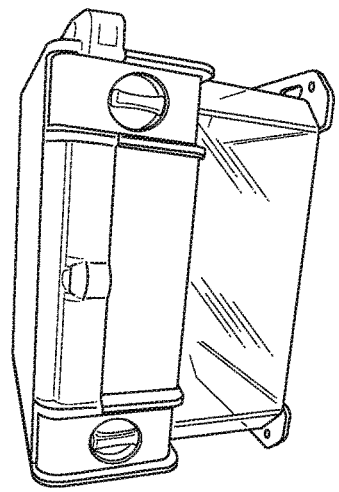
Figure 57:
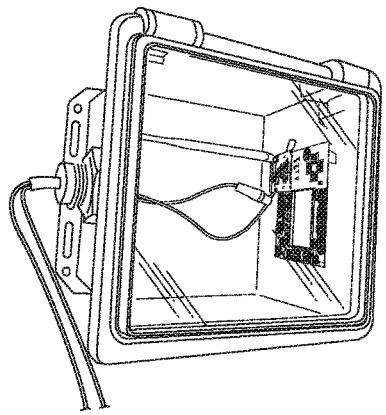

Texas Instruments™ ("TI") SmartRF Transceiver Evaluation Boards (TrxEB), illustrated in FIG. 18, were used as transceivers (910),(910') for the experimental trials. The TrXEB boards were included in the Texas Instruments™ CC1200 development kit. The software component used for analyzing the measurements was SmartRF Studio™. SmartRF Studio™ is a Microsoft™ Windows™ application that can be used to evaluate and configure the TI Transceivers. SmartRF Studio™ can be used to change and examine different parameters like frequency, modulation, bandwidth and data rate. FIG. 19 shows the user interface of the software. For testing and measurements, the Texas Instruments™ CC1200 development kit ("CC1200 kit") was used. The CC1200 kit provides a platform for hardware performance testing for the TrxEB board—including for testing received power level, packet error rate, RF range and signal robustness—as well as for software development.

The main parameters varied during the experimental trials were:

Frequency: 169 MHz, 434 MHz, 868 MHz
Depth: 2 inches, 4 inches, 6 inches, 8 inches
Distance between the nodes: 5 feet, 10 feet, 15 feet, 20 feet, 25 feet, 30 feet
Modulation Schemes: OOK, 2FSK, QPSK, GMSK
Antenna Orientation: Vertical and Horizontal Different antennas were used for each tested signal transmission frequency. Helical type antennas were used with all tested frequencies. Antenna gain for each frequency was set as follows:

169 MHz (Antenna gain=0 dBi)
434 MHz (Antenna gain=0 dBi)
868 MHz (Antenna gain=2 dBi)

FIGS. 47-57 provide images of the devices and components used in the experimental trials experiment.

Measurements, Results, and Analysis:

In the section that follows, measurements are presented and discussed. Comparison between results for different transmission frequencies, antenna orientations (vertical and horizontal), depths, distances between the nodes, bitrate, modulation schemes, and antenna gains are provided.

In addition, testing results of a communication link from water to air are provided.

A mathematical equation is provided, based on the practical measurements and observations. The mathematical equation has been derived and introduced to be used as a model to describe the relationship of total attenuation versus distance between two underwater nodes.

Measurements at 868 MHz:

FIGS. 20 and 21 provide the measurements for signal transmission at 868 MHz, with a modulation of 2-GFSK, a bit rate of 50 kbps and vertical antenna orientation.

FIGS. 22 and 23 provide the measurements for signal transmission at 868 MHz, with a modulation of 2-GFSK, a bit rate of 100 kbps and vertical antenna orientation.

FIGS. 24 and 25 provide the measurements for signal transmission at 868 MHz, with a modulation of 2-GFSK, a bit rate of 500 kbps and vertical antenna orientation.

868 MHz was the highest operating frequency used. At this frequency, attenuation was found to be very high compared to the other tested operating frequencies of, 434 MHz and 169 MHz. These results show that the higher the frequency, the higher the attenuation for the same depth underwater.

An antenna of gain 2 dBi was used to transmit more power. As illustrated in FIG. 25, communication was not possible when both transmitter and receiver were located at a depth of 8 inches underwater and 30 feet apart from each other. Attenuation was very high at this depth and frequency. The worst signal attenuation was found to occur, as shown in FIG. 25, when the highest bitrate was used (500 kbps).

Under these operating conditions, at a depth of 2 inches it was found to be possible to communicate, but the RSSI was low, as illustrated in FIGS. 20 to 25. The signal level oscillated between −60 and −90 dBm.

Generally, in the experiments when the signal level was less than −90 dBm, packet loss resulted. Accordingly, under the same operating conditions, in a practical environment, there may be packet loss.

To improve the signal to noise ratio, parameters like, antenna gain, antenna directivity, receiver sensitivity, or output power could be varied.

Referring to FIGS. 21, 23, and 25 and considering the results obtained at a specific depth, RSSI values decrease as data rate increases, where higher data rate requires wider channel band width.

Measurements at 434 MHz:

FIGS. 26 and 27 provide the measurements for signal transmission at 434 MHz, with a modulation of 2-GFSK, a bit rate of 50 kbps and vertical antenna orientation.

FIGS. 28 and 29 provide the measurements for signal transmission at 434 MHz, with a modulation of 2-GFSK, a bit rate of 100 kbps and vertical antenna orientation.

FIGS. 30 and 31 provide the measurements for signal transmission at 434 MHz, with a modulation of 2-GFSK, a bit rate of 500 kbps and vertical antenna orientation.

A spectrum analyzer was used in order to examine the received signal strength at this frequency. FIG. 32 illustrates the received signal strength at 434 MHz.

Even though the antenna gain used with this frequency is 0 dB, 2 dB less than the antenna gain used with 868 MHz signal transmission, in general the received signal level was measured to be higher compared to where signal transmission was carried out at 868 MHz. Refer to the results shown FIGS. 26 to 31. However, as compared to the results obtained at 169 MHz, described in more detail below, the attenuation is higher.

Similarly to the case described above where signal transmission occurred at 868 MHz, at a depth of 8 inches with distance of 30 feet between transmitter and receiver, effective communication was not possible because attenuation was very high and the receivers were not sensitive enough to detect such a small signal. Conversely, at a depth of 2 inches it was possible to communicate, but RSSI was relatively low. Refer to FIGS. 26 to 31.

It was observed that the signal attenuation was higher as the bit rate was increased from 50 to 100 to 500 kbps. Packet loss may increase accordingly.

Measurements at 169 MHz:

At this transmission frequency only one speed of data transmission was tested—1.2 kbps. The modulation type was BFSK. Results at these operating conditions are shown in FIGS. 33 and 34.

169 MHz was the lowest tested operating frequency. 169 MHz was found to be the most effective operating frequency to communicate underwater, as compared to the other two frequencies.

For testing at 169 MHz, an antenna having 0 dB gain was used. Underwater communication was achieved at a depth of 2, 4, and 6 inches at a maximum distance of 30 feet with good signal level, see FIGS. 33 and 34. FIG. 35 illustrates the received signal strength at 169 MHz.

The received signal at 169 MHz was examined by using the spectrum analyzer. The reception was excellent, without significant harmonics or other interference signals.

Accordingly, 169 MHz can be an effective signal transmission frequency to establish a wireless communication channel.

Considering the same conditions for all frequencies, a comparison of results can be obtained.

Different parameters for antenna gain, modulation schemes, and transmission bit rate were used in different operational parameters.

Frequency Results Comparison:

A comparison can be done for the three frequencies at a depth of 2 inches with vertical orientation antenna and distances of up to 30 feet. This comparison is illustrated in FIGS. 36 and 37. It is evident that the frequency of 868 MHz results in more attenuation for the RF signal compared to 169 MHz and 434 MHz. The RSSI value oscillates between approximately −50 to −80 dBm for the frequencies transmission at 169 and 434 MHz, while it ranges from −70 to −90 dBm for the 868 MHz. Accordingly, there is about a 20 dBm difference between these transmission frequencies.

Antenna Orientation Comparison:

The effect of antenna orientation was also investigated. By changing the antenna orientation from vertical to horizontal and keeping all other parameters are the same. All measurements were repeated. The results, as shown in FIGS. 38 and 39, disclosed no significant difference in readings due to antenna orientation change. FIGS. 38 and 39 provide the results numerically and graphically.

The results may be attributable to the antenna type that was used. The antenna used was a helical omnidirectional type antenna. Specifically, the antenna radiation pattern had a doughnut shape, pursuant to which the orientation did not affect the signal distribution.

During the testing a metallic plate was mounted as a reflector behind the antenna to increase the antenna directivity. It was clear that using an antenna reflector affected the signal transmission towards the receiver, which may be due to the signal enhancement which occurs when the metallic plate is inserted behind the antenna. This indicates that using directive antenna to establish such communication link may be beneficial.

Water-Air Communication Link:

Referring now to FIG. 40, shown therein is an experimental setup establishing a wireless communication link to send an RF signal from a node (1004) in water to a node (1004') in air, and vice versa. Experimental results are shown in FIGS. 41 and 42. When readings were taken, the transmission frequency was 169 MHz, output power was 14 dBm, bit rate was 1.2 kbps, water depth of the transceiver in node (1004) was 2 inches, and the antenna was oriented vertically.

Communication was achieved at a distance of more than 160 feet when one transceiver was inside the water and the other was outside the water. In this scenario losses may have included air-water interface loss, propagation loss of waves inside water, and a small amount of propagation loss in air.

Since the major part of the communications signal transmission path is in the air, the total amount of attenuation is small compared to water-to-water wireless communication. Accordingly, a water to surface communication link is easy to establish, with minimal difficulties in communicating the signal, as long as the node inside the water is submerged at a small depth. As touched on above, this may be because the signal attenuation in the water is partial, because most of the signal transmission path is in the air.

Mathematical Model:

In order to describe the relationship between the received RF signal, RSSI, and the distance between two transceivers communicating under water, a mathematical equation has been derived using curve fitting techniques and the measurements described above. The technique was done for results at a transmission frequency of 169 MHz, 434 MHz, 868 MHz at a depth of 2 inches.

The relationship was found to follow an exponentially decaying function. Accordingly, the RSSI degrades with distance in an exponentially decaying form. This model facilitates finding the RSSI value at any distance from the transmission node.

FIGS. 43 to 45 show the curve fitting of the frequencies 169, 434, and 868 MHz respectively. FIG. 46 lists the frequencies and their corresponding derived equations. In the table RSSI is in dBm and d is the distance between the transceivers in feet.

Some results are summarized as follows:
1. The received signal strength, RSSI, is inversely proportional to distance. Table 12 provides an equation for RRSI at each frequency, but the trend is the same for all of the tested frequencies; the relationship follows an exponentially decaying function.
2. The results show that lower transmission frequency resulted in lower attenuation of RF signal. The Experiment was carried out using three different frequencies, 868, 434, and 169 MHz.
3. The results show that shallower depth underwater results in lower signal attenuation.
4. In general, it was observed that packet loss occurred whenever the received signal level is less than −90 dBm regardless of the frequency. Therefore, this threshold value must be acceded whenever a reliable underwater RF communication link is required.
5. Total attenuation for an RF communication link between a node in water to a node in air is much lower compared to attenuation in a communication link between nodes communicating in a water-to-water communicating link. This may relate to a significantly longer underwater signal transmission distance in a water-to-water communication link.
6. Underwater communication in freshwater is feasible. Satisfactory signal transmission at a specific distance and depth, for a given application, can be achieved if appropriate frequency, antenna type, output power, receiver sensitivity, modulation scheme, and other parameters are selected.

Various embodiments of systems, apparatus and devices have been described herein by way of example only. Various modifications and variations may be made to these example embodiments without departing from the spirit and scope of the embodiments, which is limited only by the appended claims which should be given the broadest interpretation consistent with the description as a whole.

REFERENCES

[1] Xianhui Che, Ian Wells, Gordan Dickers, Paul Kear, and Xiaochun Gong, "Re-Evaluation of RF Electromagnetic Communication in Underwater Sensor Networks", IEEE Communication Magazine, Topics in Ad Hoc Sensor Networks, December 2010.
[2] Shan Jiang and Stavros Georgakopoulos, "Electromagnetic Wave Propagation into Fresh Water", Journal of Electromagnetic Analysis and Applications, 2011, 3, pages 261-266.
[3] J. H. Goh, A. Shaw, A. I. Al-Shamma'a, "Underwater Wireless Communication System", Journal of Physics, Conference Series 178, 2009. IOP publishing, Sensors and their Applications XV.
[4] Dustin Torres, "Acoustic and Optical Communication for Underwater Wireless Sensor Networks", M. Sc. Thesis, University of California, Los Angeles; 2010.
[5] Jaime Lioret, Sandra Sendra, Miguel Ardid, and Joel J. P. C. Rodrigues, "Underwater Wireless Sensor Communications in the 2.4 GHz ISM Frequency Band", Sensors 2012, 12, 4237-4264; doi:10.3390/s120404237, open access: www.mdpi.com/journal/sensors.
[6] Milica Stojanovic, "Wireless Underwater Communications and Networks: Current Achievements and Future Research Challenges", Massachusetts Institute of Technology.
[7] Maria Carmen Domingo, "Overview of channel models for underwater wireless Communication Networks", Physical Communication 1, 2008, pages 163-182.
[8] Ujjal Chakraborty, Tapas Tewary and R. P. Chatterjee, "Exploiting the Loss-Frequency Relationship using RF Communication in Underwater Communication Networks", International Conference on Computers and Devices for Communication, W M T, 2009.
[9] J. H. Goh, A. Shaw, A. I. Al-Shamma'a, "Underwater Wireless Communication System", Sensors & their Applications XV, IOP Publishing, Journal of Physics: Conference Series 178, 2009.
[10] Hao Zhang and Fanwei Meng, "Exploiting the Skin Effect using Radio Frequency Communication in Underwater Communication", International Conference on Industrial Control and Electronics Engineering, IEEE, 2012.
[11] Lloyd Butler, "Underwater Radio Communication", Amateur Radio, April 1987.
[12] Alejandro Palmeiro, Manuel Martin, Ian Crowther, and Mark Rhodes, "Underwater Radio Frequency Communications", IEEE, 2011.
[13] Lanbo Liu, Shengli Zhou, and Jun-Hong Cui, "Prospects and Problems of Wireless Communication for Underwater Sensor Networks", Wiley WCMC Special Issue on Underwater Sensor \networks.
[14] C. A. Balanis, "Advanced Engineering Electromagnetics", John Wiley & Sons, New York, 1989.

We claim:
1. A method for providing a fountain display, the method comprising:
providing a plurality of communication nodes;
submerging the plurality of communication nodes within a liquid;
providing a plurality of fountain components for providing a plurality of fountain jets of liquid, each fountain component being linked to a communication node in the plurality of communication nodes and being operable to provide a fountain jet of liquid in the plurality of fountain jets of liquid;
transmitting a plurality of fountain control signals through the liquid to the plurality of communication nodes to control the plurality of fountain jets by communicating to each communication node in the plurality of communication nodes an associated fountain control signal for controlling the fountain component linked to that communication node, wherein the plurality of fountain control signals are transmitted at a frequency in the range of 100 MHz to 1.2 GHz; and
controlling the plurality of fountain jets based on the plurality of fountain control signals.

2. The method as defined in claim 1 wherein the plurality of fountain control signals are transmitted at a frequency in the range of 169 MHz to 1.2 GHz.

3. The method as defined in claim 1 wherein the plurality of fountain control signals are transmitted at a frequency in the range of 434 MHz to 1.2 GHz.

4. The method as defined in claim 1 wherein the plurality of communication nodes comprises at least three nodes.

5. The method as defined in claim 1 wherein the plurality of fountain control signals comprises a plurality of internodal signals transmitted between different nodes in the plurality of communication nodes, and the plurality of communication nodes are further configured to transmit the plurality of internodal signals.

6. The method as defined in claim 1 wherein submerging the plurality of communication nodes within the liquid comprises each node being submerged in the liquid to within a pre-determined depth range measured from a top of an antenna for that node to a surface of the liquid.

7. The method as defined in claim 6 wherein the pre-determined depth range is 2 inches to 8 inches.

8. A fountain system comprising:
a plurality of communication nodes, each communication node being configured to operate when submerged in a liquid;
a plurality of fountain components for providing a plurality of fountain jets of liquid, each fountain component being linked to a communication node in the plurality of communication nodes and being operable to provide a fountain jet of liquid in the plurality of fountain jets of liquid; wherein
the plurality of communication nodes are operable to receive a plurality of fountain control signals transmitted through the liquid;
the plurality of communication nodes are operable to control the plurality of fountain jets by communicating to each communication node in the plurality of communication nodes an associated fountain control signal for controlling the fountain component linked to that communication node;
the plurality of fountain control signals are transmitted at a frequency in the range of 100 MHz to 1.2 GHz.

9. The system as defined in claim 8 wherein the plurality of fountain control signals are transmitted at a frequency in the range of 169 MHz to 1.2 GHz.

10. The system as defined in claim 8 wherein the plurality of fountain control signals are transmitted at a frequency in the range of 434 MHz to 1.2 GHz.

11. The system as defined in claim 8 wherein the plurality of communication nodes comprises at least three nodes.

12. The system as defined in claim 8 wherein the plurality of fountain control signals comprises a plurality of internodal signals transmitted between different nodes in the plurality of communication nodes, and the plurality of communication nodes are further configured to transmit the plurality of internodal signals.

13. The system as defined in claim 8 wherein submerging the plurality of communication nodes within the liquid comprises each node being submerged in the liquid to within a pre-determined depth range measured from a top of an antenna for that node to a surface of the liquid.

14. The system as defined in claim 13 wherein the pre-determined depth range is 2 inches to 8 inches.

15. The method as defined in claim 1, wherein each fountain control signal in the plurality of fountain control signals comprises at least one of a water pressure control signal, a nozzle inclination control signal, a nozzle angular orientation control signal, a flow rate control signal, an illumination control signal and a valve condition control signal.

16. The system as defined in claim 8, wherein each fountain control signal in the plurality of fountain control signals comprises at least one of a water pressure control signal, a nozzle inclination control signal, a nozzle angular orientation control signal, a flow rate control signal, an illumination control signal and a valve condition control signal.

17. The system as defined in claim 5, wherein each internodal signal comprises at least one identifier for identifying at least one communication node.

18. The system as defined in claim 12, wherein each internodal signal comprises at least one identifier for identifying at least one communication node.

* * * * *